United States Patent
Araki et al.

(10) Patent No.: US 7,211,635 B2
(45) Date of Patent: May 1, 2007

(54) OPTICAL MATERIAL CONTAINING CURABLE FLUORINE-CONTAINING POLYMER

(75) Inventors: Takayuki Araki, Settsu (JP); Yoshito Tanaka, Settsu (JP); Mihoko Ohashi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 271 days.

(21) Appl. No.: 10/654,971

(22) Filed: Sep. 5, 2003

(65) Prior Publication Data

US 2004/0047060 A1    Mar. 11, 2004

Related U.S. Application Data

(63) Continuation-in-part of application No. PCT/JP02/01770, filed on Feb. 27, 2002.

(30) Foreign Application Priority Data

Mar. 8, 2001   (JP) ............... 2001-064770

(51) Int. Cl.
    *C08F 16/24*    (2006.01)
(52) U.S. Cl. .............. 526/247; 174/36; 526/240; 526/244; 526/245; 436/73
(58) Field of Classification Search ........... 526/247, 526/240, 244, 245; 436/73; 174/36
    See application file for complete search history.

(56) References Cited

U.S. PATENT DOCUMENTS 6,176,895 B1 * 1/2001 DeSimone et al. ........... 75/723
6,292,292 B1 * 9/2001 Garito et al. ............ 359/341.5
6,306,975 B1 * 10/2001 Zhao et al. ................ 525/276
6,869,693 B2 * 3/2005 Fryd et al. ................. 428/690

FOREIGN PATENT DOCUMENTS

| EP | 622878 A1 | * | 11/1994 |
| EP | 1072905 A1 | * | 1/2001 |
| EP | 1375598 | * | 1/2004 |
| JP | 05/088026 A | * | 4/1993 |
| JP | 5-88026 A | | 4/1993 |
| JP | 2000-63682 A | | 2/2000 |
| JP | 2000/063682 A | * | 2/2000 |
| WO | WO-02/31896 A2 | * | 4/2002 |

OTHER PUBLICATIONS

International Search Report for PCT/JP02/01770 dated Jun. 4, 2002.
English translation of International Preliminary Examination Report for PCT/JP02/01770 dated Dec. 10, 2002.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

There can be obtained a suitable optical material which has a stable structure with a rare earth metal ion while maintaining transparency in a region of from visible light to near infrared light. The optical material is obtained by curing a fluorine-containing resin composition comprising (I) a fluorine-containing prepolymer and (II) a compound containing a rare earth metal ion and/or a rare earth metal element, wherein the fluorine-containing prepolymer (I) is a curable fluorine-containing polymer which:
(1) is a non-crystalline polymer having a fluorine content of not less than 25% by weight and
(2) has a cure site in a side chain of the polymer and/or at an end of a trunk chain of the polymer.

16 Claims, 1 Drawing Sheet

OPTICAL MATERIAL CONTAINING CURABLE FLUORINE-CONTAINING POLYMER

CROSS-REFERENCE TO RELATED APPLICATION

This is a continuation-in-part of PCT international application No. PCT/JP02/01770 filed on Feb. 27, 2002 pending.

BACKGROUND OF THE INVENTION

The present invention relates to optical materials containing a curable fluorine-containing prepolymer, and particularly relates to compositions useful as an optical material and to materials used suitably in the field of optical communication where optical amplification technology is used and in the field where luminous phenomenon is used.

An optical communication system using an optical fiber network enables high speed transmission of a large amount of data. Generally an quartz optical fiber is used as the optical fiber. However recently in plastic optical fiber (POF), a POF called GI (graded index) type POF which has a wide band (400 Mbps for 100 m transmission) and assures a low transmission loss has been developed, and construction of an optical communication network for domestic use is also considered. In the respective fibers, there is a difference in a band width of light for transmission. In the silica fiber, 1,300 nm band and 1,500 nm band are mainly used, and in the plastic (acryl) fiber, 650 nm band is mainly used.

In either of quartz optical fiber and plastic optical fiber, in an optical communication system, there arises an attenuation of an optical signal due to a loss caused at the time of transmission, branching, connection and switching. An attenuation of an optical signal is a problem particularly in case of a long distance transmission. Therefore an optical amplifier is needed to compensate for attenuation of optical signals.

Example of an optical amplifier for an optical communication system using quartz optical fiber network is, for instance, a so-called fiber type optical amplifier disclosed in the bulletin ("Light amplification with Er-doped optical fiber and application thereof", by Masataka Nakazawa, Applied Physics Vol. 59, No. 9, pp. 1175–1192 (1990)). On this device are applied pumping of electron in Erbium (Er) cation atom by visible or near infrared light and a phenomenon of generating fluorescence having a wavelength of about 1,500 nm band.

On the other hand, a luminant has been put into practical use for an inorganic glass containing a rare earth metal ion and for an electronic device for laser beam. However a present situation is such that because of difficulty in production and processing, applications thereof are limited. Also though a polymer composition is disclosed in JP64-26583A, intensity of luminescence is low.

However in case of an optical amplifier (EDFA) using Er-doped optical fiber, a 20 to 30 m long optical fiber for amplification is necessary to obtain an amplifying gain of 30 dB (1000 times). The reason for this is that for example, while a fiber type optical amplifier for 1,550 nm band uses an erbium ion ($Er^{3+}$)-doped quartz fiber, if a doping amount is increased, a cluster is formed due to association of doping ions and the amplifying action is lowered. Therefore the doping amount is decreased to 10 to 1,000 ppm and a fiber length is increased to obtain an amplifying action. As mentioned above, in case of a fiber type optical amplifier (glass), there is a limit in shortening a length of interface of the optical amplifier. Namely, there is a limit in down-sizing and cost reduction of the optical amplifier.

Also since a base material is inorganic glass, elasticity and mold-processability have not always been satisfactory.

Further in case of a fiber type optical amplifier (glass), it is difficult to make a flat optical amplifier. This causes a problem when an optical integrated circuit is made using an optical amplifier and other optical devices.

Also in case of an inorganic device as a ruminant, because of difficulty in production and processing, applications thereof are limited.

On the other hand, addition of cation of rare earth element to an organic high molecular weight material has been studied. For example, JP5-86189A discloses polysiloxane in which a rare earth metal ion obtained by using chlorosilane having an organic group and a chloride of rare earth element as starting materials is introduced to a high molecular chain. Also JP5-88026A discloses materials such as polyacrylate and polysiloxane containing a complex such as acetylacetone complex of rare earth metal ion which is excellent in solubility in an organic solvent and oxidation resistance. Further in the preprint of High Molecule Society, Vol.43(1), 29 (1994), a material obtained by synthesizing a rare earth element cation salt of a polymerizable organic acid such as acrylic acid or methacrylic acid and polymerizing or copolymerizing such a monomer carrying a rare earth element cation is reported, in which a cation concentration can be increased to about 10% by weight. By those methods, a rare earth element cation can be added in a high concentration to an organic high molecular weight material excellent in mold processability. However there are disadvantages that the synthesizing process is complicated and may give rise to an economical restriction in industrial application, and resins to be used are limited to those having relatively low heat resistance.

Also in order to enhance dispersibility of a rare earth metal ion in a resin, it is necessary that carboxylic acid groups are introduced in a high concentration to a structure of a polymer constituting an acrylic resin. However such an acrylic resin has a large water absorption and therefore cannot be practically used as an optical material which hates presence of water.

Further heat resistance is not sufficient and during a step for producing an optical amplifier or during use thereof, lowering of amplifying characteristics arises.

Also when light source having wavelength bands of 1,300 nm and 1,500 nm is used, there is a substantial disadvantage that transmittance of light is lowered since a carbon-hydrogen bond and oxygen-hydrogen bond in the organic material absorb light of such bands. Therefore studies have been made with respect to replacement of hydrogen with heavy hydrogen (D) or fluorine. As a result, transparency can be improved to a certain extent, but in case of the replacement with heavy hydrogen, water absorption of the material does not change, and in case of the replacement with fluorine, when the replacement is made to an extent of having an effect on transparency, there are disadvantages that dispersibility of a rare earth metal ion is significantly lowered and also solubility in a solvent is lowered. Also in case of the replacement with fluorine, a glass transition temperature is not increased and the problem with heat resistance cannot be solved. Further for application on a luminant using a luminous phenomenon, there is a problem with light resistance of a polymer to be used.

As mentioned above, all the problems in the fields of optical amplification material and light emission material have not been solved, and novel optical amplification material and light emission material which can solve those problems are desired.

SUMMARY OF THE INVENTION

The present inventors have made intensive studies to solve the mentioned problems and as a result, have found that the problems can be solved when a fluorine-containing resin composition prepared by a combination of a specific curable fluorine-containing polymer and a rare earth element is used, and thus have completed the present invention. The present invention provides a fluorine-containing resin composition giving excellent optical materials, particularly an optical amplification material and a light emission material.

The first of the present invention relates to a fluorine-containing resin composition comprising (I) a fluorine-containing prepolymer which is a non-crystalline polymer having a fluorine content of not less than 25% by weight and containing cure sites in a side chain of the polymer and/or at an end of a trunk chain of the polymer and (II) a compound containing a rare earth metal ion and/or a rare earth metal, and relates to a fluorine-containing resin composition which is used for an optical amplification material and a light emission material. The composition is a curable fluorine-containing resin composition having a high fluorine content and is useful as an optical material.

The above-mentioned "in a side chain of the polymer" means that the cure sites may be present at an end or in the midst of the polymer side chain or in the both thereof.

The optical amplification material and light emission material which are obtained by curing the fluorine-containing resin composition of the present invention are cured articles having a high fluorine content and therefore have a high amplifying ratio and a high intensity of luminescence and also have light resistance and heat resistance. Further those materials have a low refractive index and therefore possess enhanced characteristics for a ruminant.

More preferred as the fluorine-containing prepolymer (I) is a fluorine-containing prepolymer having a maximum absorption coefficient of not more than 1 $cm^{-1}$ in a wavelength range of from 1,290 to 1,320 nm and/or from 1,530 to 1570 nm and/or from 600 to 900 nm.

It is preferable that the cure site of the fluorine-containing prepolymer (I) is a carbon-carbon double bond. Preferred example of the carbon-carbon double bond is one being present at an end of the polymer side chain.

The carbon-carbon double bond constituting the cure site may be an ethylenic carbon-carbon double bond having a radical reactivity or an ethylenic carbon-carbon double bond having a cation reactivity.

Examples of the fluorine-containing prepolymer (I) are polymers having recurring units of a fluorine-containing ethylenic monomer having a cure site.

Example of the particularly preferred fluorine-containing prepolymer (I) is a fluorine-containing polymer having a number average molecular weight of from 500 to 1,000,000 and represented by the formula (1):

 (1)

in which the structural unit M is a structural unit derived from a fluorine-containing ethylenic monomer and represented by the formula (M):

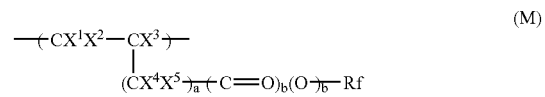

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer providing the structural unit M, and the structural unit M and the structural unit A are contained in amounts of from 0.1 to 100% by mole and from 0 to 99.9% by mole, respectively.

The second of the present invention relates to an optical amplification material obtained by curing the fluorine-containing resin composition of the above-mentioned first invention and also relates to an optical amplifier having a core part formed by using the optical amplification material.

The third of the present invention relates to a light emission material obtained by curing the fluorine-containing resin composition of the above-mentioned first invention and also relates to a light emitting device, a part or the whole of which is formed by using the light emission material.

DETAILED DESCRIPTION

Figure 1:
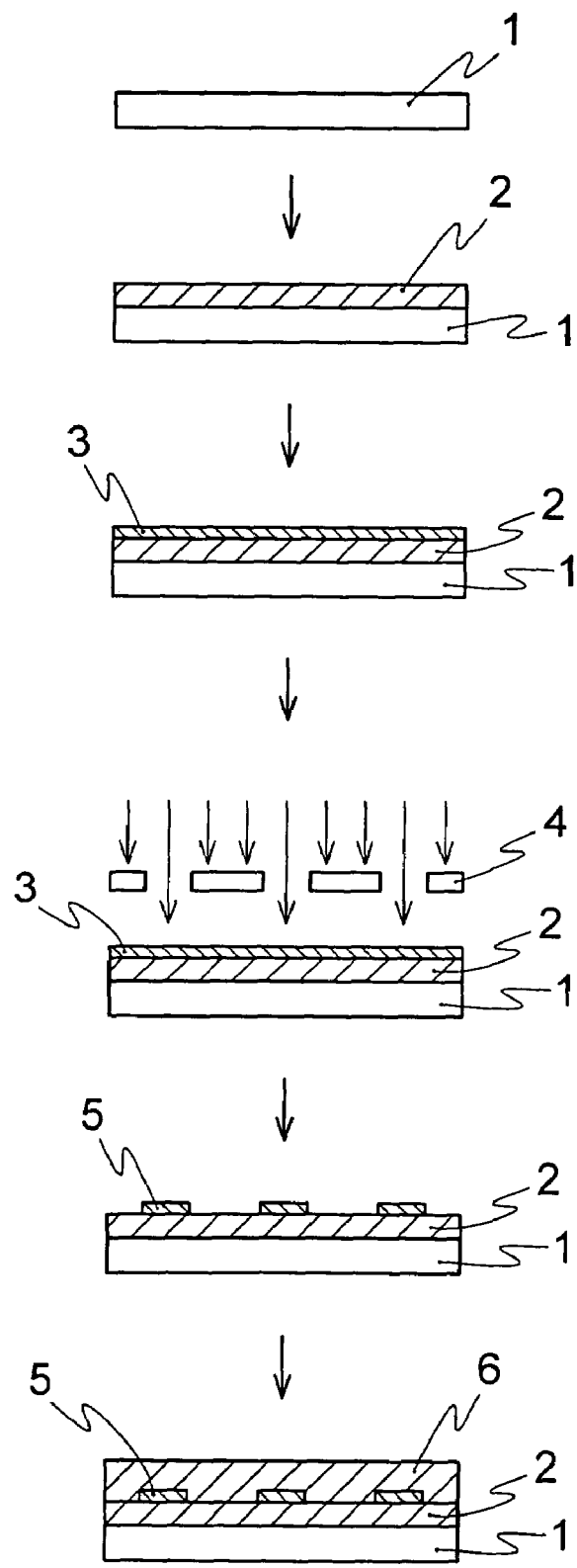
FIG. 1 is a chart showing steps for producing the optical amplifier or the light emitting device of the present invention.

Example of the preferred polymer which is used as the fluorine-containing prepolymer of the present invention is, as mentioned above, the fluorine-containing polymer having a number average molecular weight of from 500 to 1,000,000 and represented by the formula (1):

 (1)

in which the structural unit M is a structural unit derived from a fluorine-containing ethylenic monomer and represented by the formula (M):

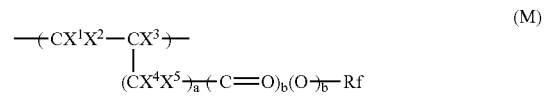

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer providing the structural unit M, and the structural unit M and the structural unit A are contained in amounts of from 0.1 to 100% by mole and from 0 to 99.9% by mole, respectively.

Namely, the fluorine-containing polymer is a homopolymer of the structural unit M derived from a fluorine-containing ethylenic monomer which gives, to the polymer side chain and/or an end of the polymer trunk chain, an ethylenic carbon-carbon double bond being curable by a reaction, or a copolymer comprising the structural unit M as an essential component.

In the Rf of the structural unit M, it is preferable that at least one of $Y^1$ is bonded to an end of the Rf.

In the fluorine-containing prepolymer (I) which is used in the present invention, the structural unit M is preferably a structural unit M1 derived from a fluorine-containing ethylenic monomer and represented by the formula (M1):

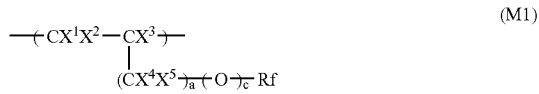

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1.

The fluorine-containing prepolymer having the structural unit M1 is preferred since transparency particularly in a near infrared region (hereinafter referred to as "near infrared transparency") is high and in case of not only a homopolymer of the structural unit M1 but also a copolymer containing an increased amount of the structural unit M1, near infrared transparency can be made high.

Further example of the preferred structural unit M1 is a structural unit M2 derived from a fluorine-containing ethylenic monomer and represented by the formula (M2):

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

The structural unit M2 is a structural unit of a fluorine-containing allyl ether having an ethylenic carbon-carbon double bond at its end and is preferred since not only near infrared transparency can be made high but also its polymerizability is good, particularly homopolymerizability and copolymerizability with other fluorine-containing ethylenic monomer are good.

Also another example of the preferred structural unit M1 is a structural unit M3 derived from a fluorine-containing ethylenic monomer and represented by the formula (M3):

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

The structural unit M3 is a structural unit of a fluorine-containing vinyl ether having an ethylenic carbon-carbon double bond at its end and is preferred since near infrared transparency can be made high and also its copolymerizability with other fluorine-containing ethylenic monomer is good.

In the fluorine-containing prepolymer (I) of the formula (1) which is used in the present invention, $Y^1$ contained in the structural units M, M1, M2 and M3 is, as mentioned above, a monovalent organic group having 2 to 10 carbon atoms and an ethylenic carbon-carbon double bond at its end.

The carbon-carbon double bond in $Y^1$ has an ability of causing a polycondensation reaction, etc. and can provide a cured (crosslinked) article. Concretely, for example, a polymerization reaction and condensation reaction are caused between the molecules of the fluorine-containing prepolymer (I) or between the fluorine-containing prepolymer (I) and a curing (crosslinking) agent to be added as case demands by contact with a radical or a cation, and thereby a cured (crosslinked) article can be provided.

The first of the preferred $Y^1$ is:

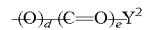

wherein $Y^2$ is an alkenyl group or fluorine-containing alkenyl group having 2 to 5 carbon atoms and an ethylenic carbon-carbon double bond at its end; d and e are the same or different and each is 0 or 1.

Example of preferred $Y^2$ is:

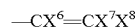

wherein $X^6$ is H, F, $CH_3$ or $CF_3$; $X^7$ and $X^8$ are the same or different and each is H or F. This group is preferred because of a high curing reactivity by contact with a radical or a cation.

Examples of the preferred $Y^2$ are:

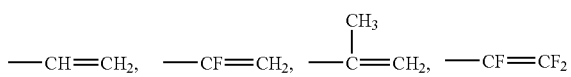

and the like.

Also more preferred $Y^1$ is:

wherein $X^6$ is H, F, $CH_3$ or $CF_3$; $X^7$ and $X^8$ are the same or different and each is H or F. This group is preferred because a curing reactivity by contact with a radical is high and a cured article can be obtained easily by photo-curing.

Examples of more preferred $Y^1$ are:

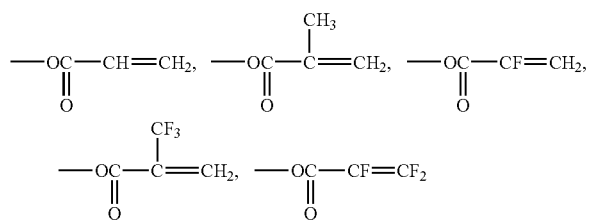

and the like.

Examples of other preferred $Y^1$ are:

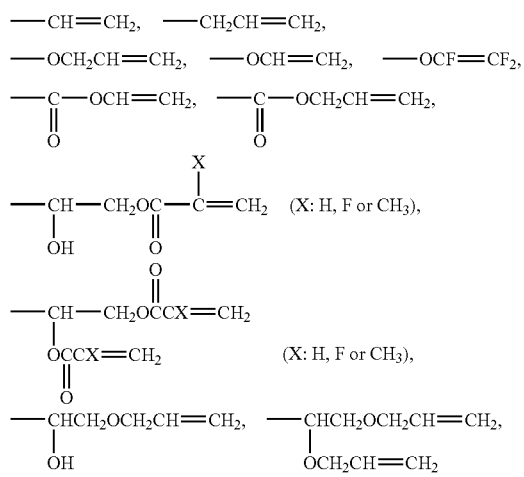

and the like.

Among the $Y^1$, those which have the structure of —O(C=O)CF=$CH_2$ are preferred because near infrared transparency can be made high, a curing (crosslinking) reactivity is particularly high and a cured article can be obtained efficiently.

The above-mentioned organic group $Y^1$ having a carbon-carbon double bond in its side chain may be introduced to an end of the polymer trunk chain.

In the fluorine-containing prepolymer (I) which is used in the present invention, —Rf— (a group obtained by excluding $Y^1$ from the above-mentioned —Rf) contained in the structural units M, M1, M2 and M3 is a fluorine-containing alkylene group having 1 to 40 carbon atoms or a fluorine-containing alkylene group having 2 to 100 carbon atoms and ether bond. This Rf group is one in which fluorine atom is bonded to carbon atom contained therein. The Rf group is generally a fluorine-containing alkylene group or fluorine-containing alkylene group having ether bond in which fluorine atom and hydrogen atom or chlorine atom are bonded to carbon atom. Preferred Rf group is one having more fluorine atoms (a high fluorine content). More preferred is a perfluoroalkylene group or a perfluoroalkylene group having ether bond. The fluorine content of the fluorine-containing prepolymer (I) is not less than 25% by weight, preferably not less than 40% by weight. Such a fluorine content is preferred because near infrared transparency of the fluorine-containing prepolymer (I) can be made high and also can be maintained even if a curing degree (crosslinking density) is increased particularly to increase heat resistance and elasticity of a cured article.

Too large number of carbon atoms of —Rf— is not preferred because there is a case where solubility in a solvent is lowered and transparency is lowered in case of a fluorine-containing alkylene group, and also because a hardness and mechanical properties of the polymer itself and the cured article are lowered in case of a fluorine-containing alkylene group having ether bond. The number of carbon atoms of the fluorine-containing alkylene group is preferably from 1 to 20, more preferably from 1 to 10. The number of carbon atoms of the fluorine-containing alkylene group having ether bond is preferably from 2 to 30, more preferably from 2 to 20.

Examples of preferred Rf are:

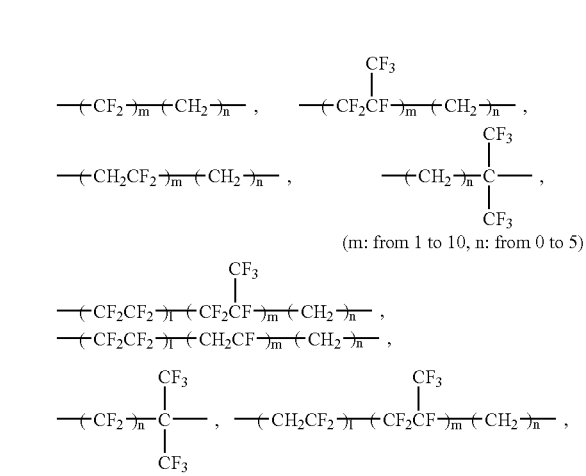

(m: from 1 to 10, n: from 0 to 5)

(l: from 1 to 10, m: from 1 to 10, n: from 0 to 5)

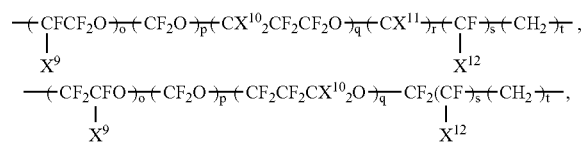

($X^9$ and $X^{12}$ are F or $CF_3$; $X^{10}$ and $X^{11}$ are H or F; o+p+q is from 1 to 30; r is 0 or 1; s and t are 0 or 1)

and the like.

As mentioned above, the structural unit M constituting the fluorine-containing prepolymer (I) of the present invention is preferably the structural unit M1 and the structural unit M1 is preferably the structural units M2 and M3. Next, mentioned below are examples of the structural units M2 and M3.

Examples of the preferred monomers constituting the structural unit M2 are:

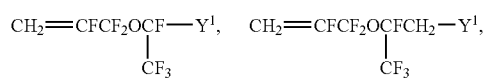

-continued

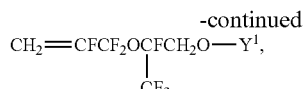
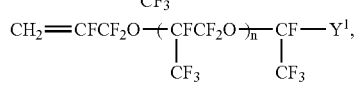
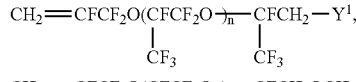
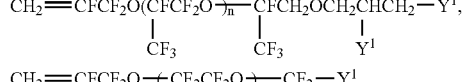
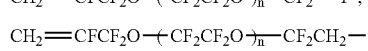
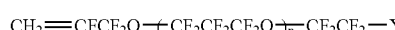
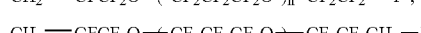
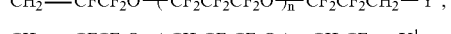
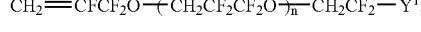
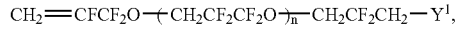
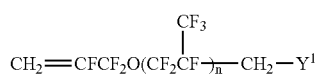

(n: an integer of from 1 to 30, $Y^1$ is as defined above).
More concretely there are:

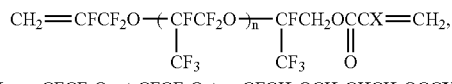
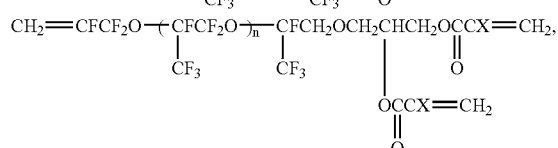
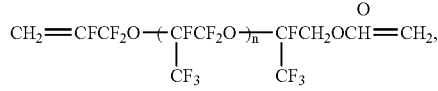
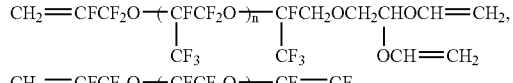
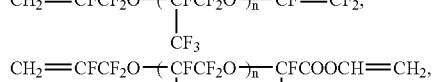
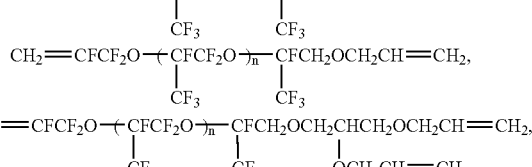
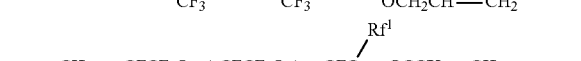
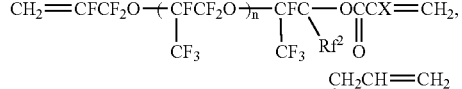
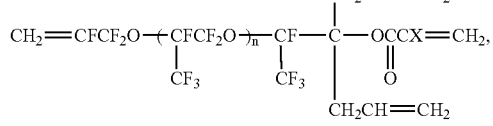

($Rf^1$ and $Rf^2$ are perfluoroalkyl groups having 1 to 5 carbon atoms; n is an integer of from 0 to 30; X is H, $CH_3$, F or $CF_3$) and the like.

Examples of the preferred monomer constituting the structural unit M3 are:

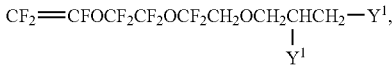
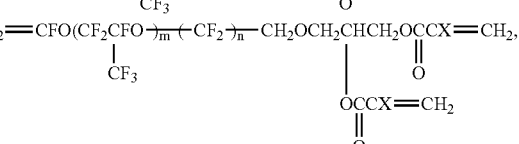
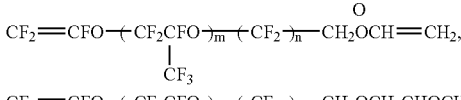
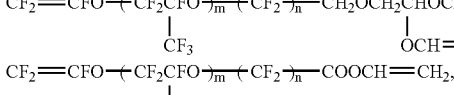
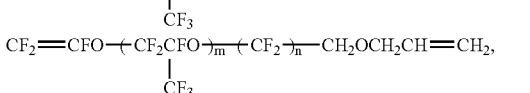

($Y^1$ is as defined above; n is an integer of from 1 to 30) and the like.

More concretely there are:

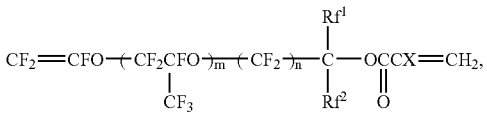

-continued $$CF_2{=}CFO{-}(CF_2CFO)_m{-}(CF_2)_n{-}\underset{\underset{CH_2CH=CH_2}{|}}{\overset{\overset{CH_2CH=CH_2}{|}}{C}}{-}\underset{\underset{}{\overset{\overset{}{\|}}{O}}}{O}CCX{=}CH_2,$$
$$\phantom{CF_2{=}CFO{-}(}\underset{CF_3}{|}$$

($Rf^1$ and $Rf^2$ are perfluoroalkyl groups having 1 to 5 carbon atoms; m is an integer of from 0 to 30; n is an integer of from 1 to 3; X is H, $CH_3$, F or $CF_3$)

and the like.

Examples of the monomer constituting the structural unit M of the fluorine-containing prepolymer (I) other than the above-mentioned structural units M2 and M3 are, for instance,

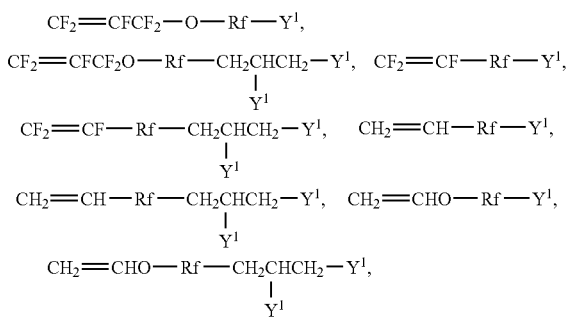

and the like wherein $Y^1$ and Rf are as defined above.

More concretely there are:

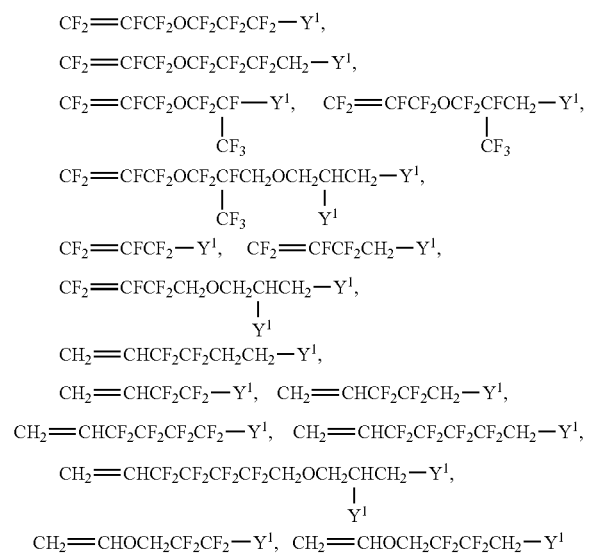

and the like, wherein $Y^1$ is as defined above.

In the fluorine-containing prepolymer (I) of the present invention, the structural unit A is an optional component. The structural unit A is not limited particularly as far as it is a monomer copolymerizable with the structural units M, M1, M2 and M3. The structural unit A may be optionally selected depending on intended applications of the fluorine-containing prepolymer and a cured article obtained therefrom and required characteristics thereof.

Examples of the structural unit A are, for instance, as follows.

(i) Structural Units Derived from Fluorine-containing Ethylenic Monomers Having Functional Group These structural units (i) are preferred from the point that adhesion to a substrate and solubility in a solvent, particularly a general-purpose solvent can be imparted to the fluorine-containing prepolymer and a cured article obtained therefrom while maintaining a high near infrared transparency, and is also preferred from the point that functions such as crosslinkability other than those affected by $Y^1$ can be imparted.

Preferred structural unit (i) of the fluorine-containing ethylenic monomer having functional group is a structural unit represented by the formula (3):

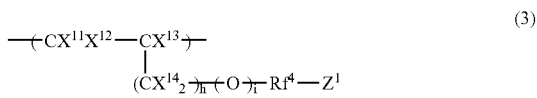

wherein $X^{11}$, $X^{12}$ and $X^{13}$ are the same or different and each is H or F; $X^{14}$ is H, F or $CF_3$; h is 0, 1 or 2; i is 0 or 1; $Rf^4$ is a fluorine-containing alkylene group having 1 to 40 carbon atoms or a fluorine-containing alkylene group having 2 to 100 carbon atoms and ether bond; $Z^1$ is a functional group selected from the group consisting of —OH, —$CH_2OH$, —COOH, carboxylic acid derivative, —$SO_3H$, sulfonic acid derivative, epoxy and cyano, and particularly preferred is a structural unit derived from:

wherein $Rf^4$ and $Z^1$ are as defined above.

More concretely there are preferably structural units derived from fluorine-containing ethylenic monomers such as:

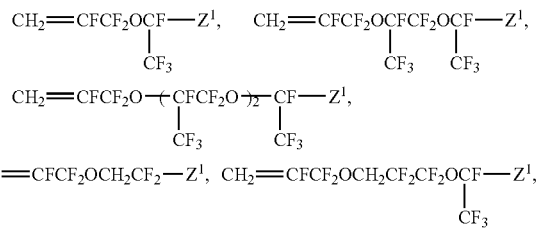

wherein $Z^1$ is as defined above.

Also there are preferred structural units derived from monomers represented by:

wherein Rf⁴ and $Z^1$ are as defined above. More concretely there are structural units derived from monomers such as:

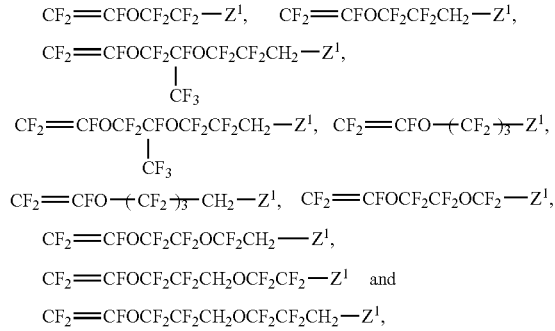

wherein $Z^1$ is as defined above.

Examples of the other fluorine-containing ethylenic monomer having functional group are:

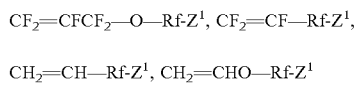

and the like, wherein —Rf— is the same as the above-mentioned —Rf— and $Z^1$ is as defined above. More concretely there are

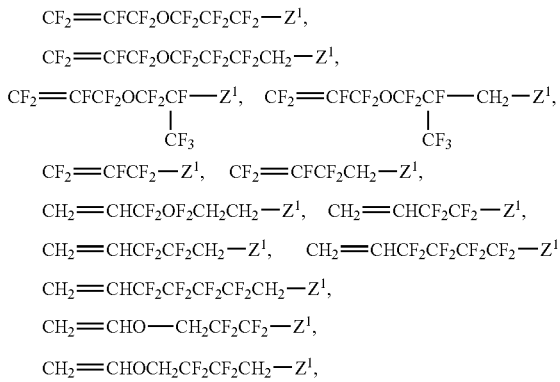

and the like, wherein $Z^1$ is as defined above.

When using the monomer having —OH group, —COOH group or —SO₃H group, it is preferable that an amount thereof is in a range where near infrared transparency is not lowered.

(ii) Structural Units Derived from Fluorine-containing Ethylenic Monomers Having no Functional Group These structural units (ii) are preferred from the point that a higher near infrared transparency of the fluorine-containing prepolymer and a cured article obtained therefrom can be maintained and also from the point that transparency can be increased. Further these structural units are preferred from the point that by selecting the monomer, mechanical properties and glass transition temperature of the polymer can be adjusted, particularly the glass transition temperature can be increased by copolymerization with the structural unit M.

Examples of the preferred structural units (ii) of the fluorine-containing ethylenic monomer are those represented by the formula (4):

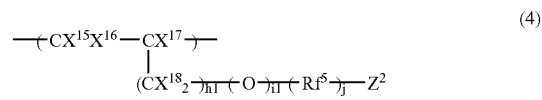

wherein $X^{15}$, $X^{16}$ and $X^{18}$ are the same or different and each is H or F; $X^{17}$ is H, F or CF₃; h1, i1 and j are 0 or 1; $Z^2$ is H, F or Cl; Rf⁵ is a fluorine-containing alkylene group having 1 to 20 carbon atoms or a fluorine-containing alkylene group having 2 to 100 carbon atoms and ether bond.

Examples thereof are preferably structural units derived from monomers such as:

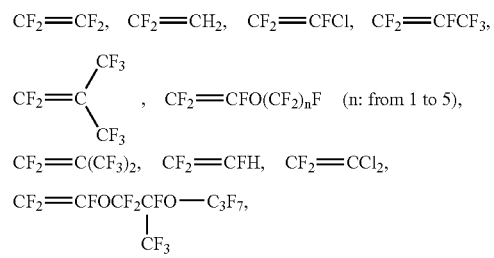

$CH_2=CF-(CF_2)_n-Z^2$ ($Z^2$ is as defined in the formula (4), n is from 1 to 10) and $CH_2=CHOCH_2-(CF_2)_n-Z^2$ ($Z^2$ is as defined in the formula (4), n is from 1 to 10).

(iii) Fluorine-containing Aliphatic Ring Structural Units

Introduction of these structural units (iii) is preferred since transparency can be increased and a near infrared transparency can be increased more and further since the fluorine-containing prepolymer (I) having a high glass transition temperature can be obtained and a higher hardness of the cured article can be expected.

Examples of the preferred fluorine-containing aliphatic ring structural unit (iii) are those represented by the formula (5):

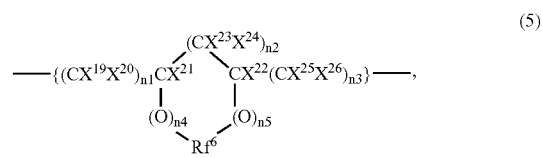

wherein $X^{19}$, $X^{20}$, $X^{23}$, $X^{24}$, $X^{25}$ and $X^{26}$ are the same or different and each is H or F; $X^{21}$ and $X^{22}$ are the same or different and each is H, F, Cl or CF₃; Rf⁶ is a fluorine-containing alkylene group having 1 to 10 carbon atoms or a fluorine-containing alkylene group having 2 to 10 carbon atoms and ether bond; n2 is 0 or an integer of from 1 to 3; n1, n3, n4 and n5 are the same or different and each is 0 or 1.

For example, there are structural units represented by:

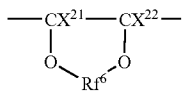

wherein $Rf^6$, $X^{21}$ and $X^{22}$ are as defined above.

Concretely there are:

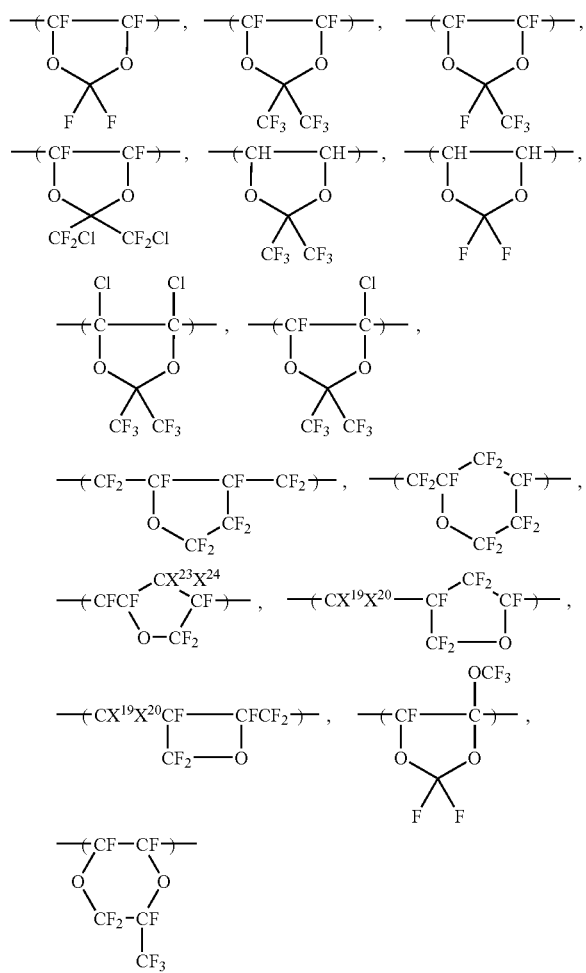

and the like wherein $X^{19}$, $X^{20}$, $X^{23}$ and $X^{24}$ are as defined above.

Examples of the other fluorine-containing aliphatic ring structural unit are, for instance,

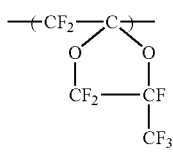

and the like.

(iv) Structural Units Derived from Ethylenic Monomers Having no Fluorine

The structural units (iv) derived from ethylenic monomers having no fluorine may be introduced to the polymer in a range where the introduction does not have an adverse effect on near infrared transparency.

By the introduction of these structural units (iv), solubility in a general-purpose solvent is enhanced and compatibility with additives, for example, a photocatalyst and a curing agent to be added as case demands can be improved.

Examples of the non-fluorine-containing ethylenic monomer are as follows.

α-Olefins:

Ethylene, propylene, butene, vinyl chloride, vinylidene chloride and the like.

Vinyl Ether or Vinyl Ester Monomers:

$CH_2=CHOR$, $CH_2=CHOCOR$ (R: hydrocarbon group having 1 to 20 carbon atoms) and the like.

Allyl Monomers:

$CH_2=CHCH_2Cl$, $CH_2=CHCH_2OH$, $CH_2=CHCH_2COOH$, $CH_2=CHCH_2Br$ and the like.

Allyl Ether Monomers:

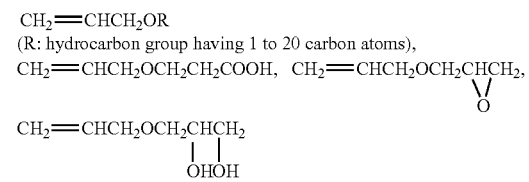

and the like.

Acrylic or Methacrylic Monomers:

Acrylic acid, methacrylic acid, acrylic acid esters, methacrylic acid esters, maleic anhydride, maleic acid, maleic acid esters and the like.

Monomers obtained by replacing a part or the whole of hydrogen atoms of the above-mentioned non-fluorine-containing monomers with heavy hydrogen atoms are more preferred from the viewpoint of transparency.

(v) Structural Units Derived from Alicyclic Monomers

A structural unit (v) of an alicyclic monomer may be introduced as a component copolymerizable with the structural unit M, more preferably as the third component in addition to the structural unit M and the structural unit of the above-mentioned fluorine-containing ethylenic monomer or non-fluorine-containing ethylenic monomer (the above-mentioned (iii) or (iv)), thereby making a glass transition temperature and hardness high.

Examples of the alicyclic monomer (v) are norbornene derivatives represented by:

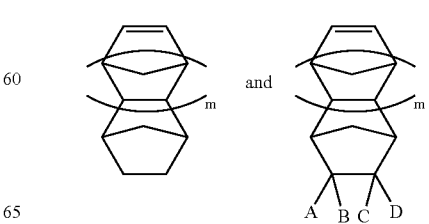

wherein m is 0 or an integer of from 1 to 3; A, B, C and D are the same or different and each is H, F, Cl, COOH, $CH_2OH$, a perfluoroalkyl group having 1 to 5 carbon atoms or the like, alicyclic monomers such as:

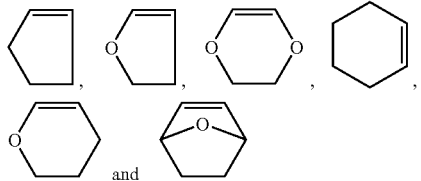

and derivatives thereof in which a substituent is introduced.

In the fluorine-containing prepolymer (I) of the present invention, various combinations and proportions of the structural units M (M1, M2 or M3) and A can be selected from the above-mentioned examples depending on intended applications, physical properties (particularly glass transition temperature, hardness, etc.), functions (transparency and near infrared transparency) and the like as far as the combination of the structural units M and A makes the polymer non-crystalline and the fluorine content becomes not less than 25% by weight.

The fluorine-containing prepolymer (I) of the present invention contains the structural unit M (M1, M2 or M3) as an essential component and is characterized in that the structural unit M itself has functions of maintaining a high near infrared transparency and imparting transparency and functions of being capable of imparting hardness, heat resistance, abrasion resistance, scratch resistance and solvent resistance to a cured article by the curing. Also the prepolymer (I) is characterized in that a refractive index can be controlled by adjusting the content of the structural unit M. Therefore even if the fluorine-containing prepolymer (I) contains a larger amount of the structural unit M or in the extreme case, even if the prepolymer consists of the structural unit M (100% by mole), a high near infrared transparency can be maintained. Further a cured article having a high curing (crosslinking) density can be obtained and a coating film having a high hardness and excellent abrasion resistance, scratch resistance and heat resistance can be obtained.

Also in the case of the copolymer comprising the structural unit M and the structural unit A of the prepolymer (I), when the structural unit A is selected from the above-mentioned examples, there can be obtained the prepolymer providing a cured article having a higher hardness, a high glass transition temperature and a high near infrared transparency.

In the copolymer comprising the structural unit M and the structural unit A of the prepolymer (I), the proportion of the structural unit M may be not less than 0.1% by mole based on the whole structural units constituting the fluorine-containing prepolymer (I). The proportion is not less than 2.0% by mole, preferably not less than 5% by mole, more preferably not less than 10% by mole in order to obtain the cured article having a high hardness, excellent abrasion resistance and scratch resistance and good chemical resistance and solvent resistance by curing (crosslinking).

Particularly for the optical material applications which require formation of a cured coating film having excellent heat resistance and transparency and small moisture absorption, it is preferable that the structural unit M is contained in an amount of not less than 10% by mole, preferably not less than 20% by mole, more preferably not less than 50% by mole. An upper limit thereof is lower than 100% by mole.

The curable fluorine-containing prepolymer (I) of the present invention has preferable characteristics particularly for the optical amplification material application in near infrared region and the light emission material application in a region of from visible light to near infrared ray since transparency is not lowered even if the proportion of the structural unit M is increased (or even if the number of cure sites is increased).

In case of the optical amplification material in optical communication applications and the light emission material in a region of from visible light to near infrared ray where a high transparency is required, it is important that the curable fluorine-containing prepolymer (I) has a combination and proportion of the structural units M and A which make the prepolymer non-crystalline. Being non-crystalline means that in DSC analysis, when measurement is carried out at a heating rate of 10° C./min (ASTM D3418-99), an absorption peak resulting from melting is not substantially observed or heat of fusion is 1 J/g or lower at the 2nd run.

It is preferable that the fluorine content of the curable fluorine-containing prepolymer (I) is not less than 25% by weight.

If the fluorine content is low, transparency in a near infrared region is lowered. Also if the fluorine content is low, moisture absorption is increased and therefore the prepolymer cannot be used substantially as an optical material for optical communication, etc. For the optical amplification material and light emission material applications, most preferable fluorine content is not less than 40% by weight. An upper limit of the fluorine content varies depending on the components of the fluorine-containing prepolymer (I) and is about 75% by weight which is a fluorine content when all hydrogen atoms are replaced with fluorine atoms.

As a method of measuring a fluorine content, generally there is used a method of calculating the fluorine content by analyzing components of a polymer from measurements with $^{19}$F-NMR and $^1$H-NMR. When it is difficult to analyze a polymer structure by the above methods, there is used a method of elementary analysis of fluorine in which 2 mg of a sample and a combustion improver (10 mg of sodium peroxide) are wrapped with a filter paper (filter paper No.7 available from Toyo Roshi), are put in a platinum basket and then are burned in a 500 ml flask filled with 25 ml of pure water. Immediately after the burning, the flask is shaken to absorb fluorine ion in pure water and then fluorine ion absorbed in pure water is analyzed with a fluorine ion electrode (fluorine ion meter model 901 available from Orion Research).

The curable fluorine-containing prepolymer (I) of the present invention is preferably one having a maximum absorption coefficient of not more than 1 $cm^{-1}$ at a specific band to be amplified (1,290 to 1,320 nm, 1,530 to 1,570 nm or 600 to 900 nm). Prepolymers having an absorption coefficient higher than that is not suitable as an optical amplification material used for optical communication.

The molecular weight of the fluorine-containing prepolymer (I) can be selected, for example, in a range of from 500 to 1,000,000 in number average molecular weight, and is preferably from 1,000 to 500,000, particularly preferably from 2,000 to 200,000.

If the molecular weight is too low, mechanical properties are apt to be insufficient even after the curing, and particularly a cured article and a cured coating film are apt to be fragile and insufficient in strength. If the molecular weight is too high, solubility in a solvent is lowered, particularly film forming property and leveling property are apt to be lowered at forming a thin film and storage stability of the fluorine-containing prepolymer is apt to be unstable. For optical applications, most preferable molecular weight is selected in a range of from 5,000 to 100,000 in number average molecular weight.

It is preferable that the fluorine-containing prepolymer (I) itself (before curing) has a maximum absorption coefficient of not more than 1 cm$^{-1}$, more preferably not more than 0.5 cm$^{-1}$, particularly preferably not more than 0.1 cm$^{-1}$ in a wavelength range of from 1,290 to 1,320 nm and/or from 1,530 to 1,570 nm and/or from 600 to 900 nm and further has a refraction index nd of from 1.3 to 1.7. Adjustments thereof can be made by determining various kinds and contents of the structural unit M and kinds of the structural unit A to be used as case demands and make selection of a clad easy at forming an optical device.

Further it is preferable that the fluorine-containing prepolymer is soluble in general-purpose solvents, for example, in at least one of ketone solvents, acetic acid ester solvents, alcohol solvents and aromatic solvents or in solvent mixtures containing at least one of the above-mentioned general-purpose solvents.

When the prepolymer is soluble in general-purpose solvents, it is preferable because film forming property and homogeneity are excellent particularly in case of forming a thin coating film of about 3 μm in a process for forming an optical device. The prepolymer is also advantageous from the viewpoint of productivity in forming an optical device.

Being soluble in a solvent according to the present invention means that the fluorine-containing prepolymer is soluble in a solvent in an amount of 10 mg/g, preferably 20 mg/g, more preferably 50 mg/g.

In order to obtain the fluorine-containing prepolymer (I) of the present invention, generally any of:
(i) a method of previously synthesizing a monomer having Y$^1$ and then polymerizing,
(ii) a method of once synthesizing a polymer having another functional group and then converting the functional group by high molecular reaction, thus introducing the functional group Y$^1$ into the polymer, or the like method can be employed.

In the method (i), in order to obtain the fluorine-containing prepolymer (I) having a carbon-carbon double bond in its side chain without reacting (curing) the carbon-carbon double bond at an end of its side chain, it is necessary to change reactivity of two kinds of double bonds (a double bond becoming a trunk chain and a double bond becoming a side chain) in a (co)polymerizable monomer and thereby make only one of the double bonds participate in the polymerization. In such a method, it is difficult to select the polymerization conditions to obtain the fluorine-containing prepolymer having a double bond in its side chain, and also it is difficult to increase a curing reactivity of the double bond in the side chain of the obtained fluorine-containing prepolymer. Therefore the method (ii) is preferred.

The method (ii) is a preferable method since it is easy to obtain the fluorine-containing prepolymer of the present invention without curing reaction and also since a carbon-carbon double bond having a high curing reactivity can be introduced to its side chain.

Among the methods (ii), as mentioned infra, there is preferably employed, for example, a method of obtaining the fluorine-containing prepolymer by synthesizing the fluorine-containing polymer comprising the structural unit N of fluorine-containing monomer having hydroxyl or an organic group Y$^3$ having hydroxyl and as case demands, the structural unit B of monomer copolymerizable with N, and then reacting the polymer with an unsaturated carboxylic acid or its derivative to introduce a carbon-carbon double bond to a side chain and/or an end of a trunk chain of the polymer, preferably to an end of the side chain.

The details of the method are explained below.

First, the fluorine-containing prepolymer (I) is prepared by esterification of a fluorine-containing polymer (IV) having hydroxyl with an unsaturated carboxylic acid or its derivative in which the fluorine-containing polymer (IV) is a polymer represented by the formula (2):

  (2)

in which the structural unit N is a structural unit having hydroxyl which is derived from a fluorine-containing ethylenic monomer and represented by the formula (N):

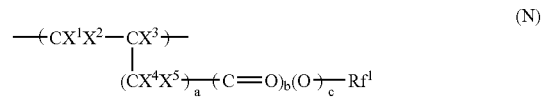  (N)

wherein X$^1$ and X$^2$ are the same or different and each is H or F; X$^3$ is H, F, CH$_3$ or CF$_3$; X$^4$ and X$^5$ are the same or different and each is H, F or CF$_3$; Rf$^1$ is an organic group in which 1 to 3 of Y$^3$ (Y$^3$ is hydroxyl or a monovalent organic group having hydroxyl and 1 to 10 carbon atoms) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit B is a structural unit derived from monomer copolymerizable with the fluorine-containing ethylenic monomer having hydroxyl and providing the structural unit N, and the structural unit N and the structural unit B are contained in amounts of from 0.1 to 100% by mole and from 0 to 99.9% by mole, respectively.

In the above-mentioned process for preparing the fluorine-containing prepolymer (I), examples of the preferable structural unit N of the fluorine-containing polymer (IV) having hydroxyl which is a precursor represented by the formula (2) are structures which correspond to the above-exemplified respective structural units M of the fluorine-containing prepolymer (I) and have the Y$^3$ having OH group instead of the Y$^1$ having a carbon-carbon double bond. Those structural units can be used preferably. As the structural unit B, there can be preferably used the same structural units as the above-mentioned structural unit A.

The unsaturated carboxylic acid or its derivative which is reacted with the fluorine-containing polymer (IV) having hydroxyl may be any of carboxylic acids or derivatives thereof having a carbon-carbon double bond at an end thereof. Particularly preferred are α,β-unsaturated carboxylic acids or derivatives thereof.

Examples thereof are, for instance, carboxylic acids represented by:

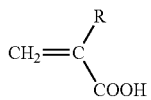

wherein R is H, CH₃, F, CF₃ or Cl, or anhydrides thereof, acid halides represented by:

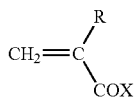

wherein R is as defined above, X is Cl or F, and in addition, maleic acid, maleic anhydride, monoalkylester of maleic acid and the like.

Among them, unsaturated carboxylic acid halides are preferred since the reaction can be carried out at room temperature and gelling of a prepared polymer can be prevented.

Particularly preferred are:

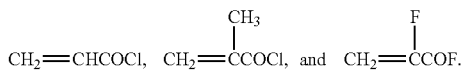

The method of reacting the fluorine-containing polymer (IV) having hydroxyl with α,β-unsaturated carboxylic acid halide is not limited particularly and is usually carried out by dissolving the fluorine-containing polymer (IV) having hydroxyl in a solvent and mixing the α,β-unsaturated carboxylic acid halide thereto at a temperature of from about −20° C. to about 40° C. with stirring for reaction.

In the reaction, HCl and HF are produced through the reaction, and for capturing them, it is desirable to add a proper base. Examples of the base are tertiary amines such as pyridine, N,N-dimethylaniline, tetramethylurea and triethylamine, magnesium metal and the like. Also an inhibitor may be present to prevent a polymerization reaction of the carbon-carbon double bond in the starting α,β-unsaturated carboxylic acid and the obtained curable fluorine-containing prepolymer during the reaction.

Examples of the inhibitor are hydroquinone, t-butyl hydroquinone, hydroquinone monomethylether and the like.

The fluorine-containing polymer (IV) having hydroxyl before the reaction with the α,β-unsaturated carboxylic acid or its derivative can be obtained by (co)polymerizing, through known method, the respective component units such as the ethylenic monomer (N) having hydroxyl and the monomer (B) when used as a copolymerizable component. For the polymerization, radical polymerization method, anion polymerization method, cation polymerization method and the like can be employed. Among them, the radical polymerization method is preferably used from the point that each monomer exemplified to obtain the fluorine-containing polymer (IV) having hydroxyl has good radial polymerizability, control of composition and molecular weight of the obtained polymer is easy and production in an industrial scale is easy.

In order to initiate the radical polymerization, means for initiation is not limited particularly as far as the polymerization proceeds radically. The polymerization is initiated, for example, with an organic or inorganic radical polymerization initiator, heat, light, ionizing radiation or the like. The polymerization can be carried out by solution polymerization, bulk polymerization, suspension polymerization, emulsion polymerization or the like. The molecular weight is controlled by the contents of the monomers to be used for the polymerization, the content of the polymerization initiator, the content of a chain transfer agent, temperature, etc. The components of the copolymer can be controlled by the starting monomer components.

The compound (II) containing a rare earth metal ion and/or a rare earth metal (hereinafter simply referred to as "rare earth metal element") which is an another component in the fluorine-containing resin composition of the present invention is contained to impart optical functionality, namely optical amplifying action and light emitting action to the resin composition.

In the present invention, the rare earth metal element (II) is contained in the curable fluorine-containing prepolymer (I). The rare earth metal element (II) functions to impart optical amplifying action to the fluorine-containing resin composition. The rare earth metal element which is used in the present invention represents any of elements included in Group 3A of Periodic Table such as scandium (Sc), yttrium (Y) and generally called lanthanides, namely, lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). The fluorine-containing resin composition of the present invention finally contains the rare earth metal element, and the rare earth metal elements may be mixed solely or in a mixture thereof.

The rare earth metal element is usually mixed in the form of a halide, salt or complex compound. Concretely halides such as chlorides, bromides and iodides; and salts such as nitrates, perchlorates, bromates, acetates, sulfates and phosphates are suitable from the viewpoint of dispersibility in the curable fluorine-containing prepolymer (I). Also double nitrates, double sulfates, chelated compounds and complex can be used. Examples thereof are sulfonamides, sulfonimides, β-diketones, sulfonic acids, phosphoric acids and the like. Particularly preferred are fluorine-containing compounds thereof.

Examples of the preferred rare earth metal-containing compounds in the present invention are praseodymium compounds such as praseodymium chloride, praseodymium bromide, praseodymium iodide, praseodymium nitrate, praseodymium perchlorate, praseodymium bromate, praseodymium acetate, praseodymium sulfate and praseodymium phosphate; neodymium compounds such as neodymium chloride, neodymium bromide, neodymium iodide, neodymium nitrate, neodymium perchlorate, neodymium bromate, neodymium acetate, neodymium sulfate and neodymium phosphate; europium compounds such as europium chloride, europium bromide, europium iodide, europium nitrate, europium perchlorate, europium bromate, europium acetate, europium sulfate and europium phosphate; dysprosium compounds such as dysprosium chloride, dysprosium bromide, dysprosium iodide, dysprosium nitrate, dysprosium perchlorate, dysprosium bromate, dysprosium acetate, dysprosium sulfate and dysprosium phosphate; erbium compounds such as erbium chloride, erbium bromide, erbium iodide, erbium nitrate, erbium perchlorate, erbium bromate, erbium acetate, erbium sulfate and erbium phosphate; and the like.

Further examples of the preferred rare earth metal-containing complex are, for instance, tris(dibenzoylmethyde) erbium (III), tris(benzoyltrifluoroacetonate) erbium (III), tris(hexafluoroacetonate) erbium (III), tris(dibenzoylmethyde) neodymium (III), tris(benzoyltrifluoroacetonate) neodymium (III), tris(hexafluoroacetonate) neodymium (III), and the like. Also tetrakis complex thereof such as tetrakis(hexafluoroacetonate) neodymium (III) may be used. Other examples are $Nd[C_8F_{17}SO_2NSO_2C_8F_{17}]_3$, $Nd[C_4F_9SO_2NSO_2C_4F_9]_3$, $Nd[C_6F_5SO_2NSO_2C_6F_5]_3$, $Nd[C_4F_9SO_2NSO_2C_6F_5]_3$, $Nd[C_4F_9SO_2NSO_2C_8F_{17}]_3$, $Nd[C_6F_{13}SO_2NSO_2C_6F_3]_3$, $Nd[C_2F_5SO_2NSO_2C_2F_5]_3$, $Nd[CF_3SO_2NSO_2CF_3]_3$, $Nd[C_4F_9SO_2NCOC_3F_7]_3$, $Nd[C_4F_9SO_2NCOCF_3]_3$, $Nd[O_3SC_8F_{17}]_3$, $Nd[O_3SCF_3]_3$ and the like.

For optical amplifying device application, praseodymium salts, neodymium salts and erbium salts which have an ability of generating near infrared fluorescence are particularly suitable. Among them, most suitable are neodymium salts, praseodymium salts and erbium salts which have an ability of generating fluorescence having a wavelength of about 1,300 nm to about 1,550 nm which are suitable signal wavelength for a fiber of inorganic glass such as silica glass. Also europium salts are most suitable for amplification of 650 nm band which is a wavelength of a visible light to be used for optical fiber using an organic high molecular weight material. For luminant application, thulium salts for emitting blue luminescence, terbium salts for emitting green luminescence and europium salts for emitting red luminescence are suitable.

It is preferable that the fluorine-containing resin composition of the present invention finally contains from 0.001 to 25% by weight (% by weight of ion) of the rare earth metal element. The content of the rare earth metal element varies depending on kind of the fluorine-containing prepolymer (I) and rare earth metal element (II). If the content of the rare earth metal element (II) is less than 0.001% by weight, desired properties such as intended optical amplifying action and light emitting action are hardly exhibited. On the other hand, if the content of the rare earth metal element exceeds 25% by weight, there is a case where dispersibility of the rare earth metal element is lowered. The both cases are not preferable. In applications for optical communication parts such as optical amplifier and for light emitting device, the content of the rare earth metal element is selected in the range of preferably from 0.01 to 20% by weight, more preferably from 0.1 to 15% by weight, most preferably from 0.5 to 10% by weight from the viewpoint of fluorescence intensity. The content of the rare earth metal element can be measured quantitatively by burning an organic component in an electric oven of about 600° C. and determining an ash content thereof or by a physical and chemical method such as fluorescent X-ray analysis.

When the curable fluorine-containing prepolymer (I) of the present invention is used for optical communication, its absorption coefficient need be not more than 1 $cm^{-1}$ in each communication band, namely in the wavelength ranges of from 600 to 900 nm, from 1,290 to 1,320 nm and from 1,530 to 1,570 nm. If the absorption coefficient exceeds 1 $cm^{-1}$ in those wavelength ranges, the prepolymer absorbs an optical signal itself and cannot function as an amplifier. In the fluorine-containing composition of the present invention containing a rare earth metal element (II), since the rare earth metal element has sensitive absorption in a specific wavelength range, there is a case where the absorption coefficient of the composition exceeds 1 $cm^{-1}$ in such a wavelength range. Namely, an absorption wavelength of the rare earth metal is, for example, 980 nm, 1,480 nm, etc. in case of erbium, 820 nm, etc. in case of neodymium, and 1,017 nm, etc. in case of praseodymium. When the composition is used as a visible light emission material, it is desirable that the composition is transparent in a visible light range.

In the optical amplifier such as an optical fiber amplifier which functions to compensate for attenuation of communication light, there is used an amplification action in which a pumping radiation effectively exciting the rare earth metal which emits fluorescence of the wavelength of communication light is passed continuously and by phenomenon of induced emission caused by the communication light pulse, fluorescence having the same pulse waveform as the communication light pulse is generated. Therefore in case where the fluorine-containing resin composition of the present invention is used for optical amplifier application, it is necessary for the composition to have an ability of generating fluorescence in a pumping radiation derived from the rare earth metal element (II).

The method of introducing the rare earth metal element (II) to the curable fluorine-containing prepolymer (I) is not limited particularly. A compound (salt or complex) containing a rare earth metal element may be dissolved or dispersed in the curable fluorine-containing prepolymer (I), or the rare earth metal element may be carried on a trunk chain, a polymer end or a polymer side chain of the curable fluorine-containing prepolymer (I) by ionic bond, coordinate bond or clathration.

For example, there are (1) a method of adding a rare earth metal compound (salt or complex) to a fluorine-containing monomer having a carbon-carbon double bond and giving the structural unit M and then preparing the curable fluorine-containing prepolymer (I) by a known synthesizing method such as melt polymerization or anion polymerization, (2) a method of adding and mixing a rare earth metal compound (salt or complex) to a solution obtained by dissolving the curable fluorine-containing prepolymer (I) in a solvent and then eliminating the solvent, (3) a method of melt-kneading the curable fluorine-containing prepolymer (I) and a rare earth metal compound (salt or complex), and the like method. In any methods, it is desirable that the curing is carried out after processing and molding into a final product.

Among those methods, the method (2) is most suitable from the point that the rare earth metal compound (salt or complex) can be dispersed uniformly in the curable fluorine-containing prepolymer. Particularly suitable is the method of dissolving the curable fluorine-containing prepolymer in a solvent containing the rare earth metal compound and then heating up the obtained uniform solution to distill off the solvent. The composition in the form of solution or dispersion may be used as a starting solution in a process for forming an optical device without distilling off the solvent.

The curable fluorine-containing resin composition of the present invention can be obtained only from the fluorine-containing prepolymer (I) and the rare earth metal element (II) and may be in the form of a photo-curable composition by further adding an active energy curing initiator (III) such as a photo-radical generator (III-1) or a photo-acid generator (III-2).

The active energy curing initiator (III) generates a radical or a cation (acid) only by irradiating an active energy ray, for example, an electromagnetic wave having a wavelength of not more than 350 nm such as ultraviolet light, electron beam, X-ray, γ-ray or the like and functions as a catalyst for initiating curing (crosslinking reaction) of the carbon-carbon double bond of the fluorine-containing prepolymer. Usually an initiator generating a radical or a cation (acid) by irradiation of ultraviolet light is used and particularly one which generates a radical is used.

According to the fluorine-containing resin composition of the present invention for optical amplification materials and light emission materials, the curing reaction can be initiated easily with the above-mentioned active energy rays, heating at high temperature is not necessary and the curing reaction can be carried out at relatively low temperature. Therefore the fluorine-containing resin composition is preferred since it can be applied on a substrate, for example, a transparent resin substrate having a low heat resistance which is apt to be deformed, decomposed or colored due to heat.

In the composition of the present invention, the active energy curing initiator (III) is optionally selected depending on kind (radical-reactive or cation (acid)-reactive) of the carbon-carbon double bond in the fluorine-containing prepolymer (I), kind (wavelength range, etc.) of the active energy ray, intensity of irradiation, etc.

Generally examples of the initiator (photo-radical generator) which functions to cure the fluorine-containing polymer (I) having a radical-reactive carbon-carbon double bond with active energy ray in an ultraviolet region are, for instance, those mentioned below.

Acetophenone Initiators

Acetophenone, chloroacetophenone, diethoxyacetophenone, hydroxyacetophenone, α-aminoacetophenone and the like.

Benzoin Initiators

Benzoin, benzoin methyl ether, benzoin ethyl ether, benzoin isopropyl ether, benzoin isobutyl ether, benzyldimethylketal and the like.

Benzophenone Initiators

Benzophenone, benzoylbenzoic acid, methylobenzoylbenzoate, 4-phenylbenzophenone, hydroxybenzophenone, hydroxy-propylbenzophenone, acrylated benzophenone, Michler's ketone and the like.

Thioxanthone Initiators

Thioxanthone, chlorothioxanthone, methylthioxanthone, diethylthioxanthone, dimethylthioxanthone and the like.

Other Initiators

Benzyl, α-acyloxime ester, acylphosphine oxide, glyoxyester, 3-ketocoumaran, 2-ethylanthraquinone, camphorquinone, anthraquinone and the like.

Also as case demands, an auxiliary for photo-initiation such as amines, sulfones or sulfines may be added.

Also examples of the initiator (photoactive acid generator) which cures the fluorine-containing prepolymer (I) having a cation(or acid)-reactive carbon-carbon double bond are those mentioned below.

Onium Salts

Iodonium salt, sulfonium salt, phosphonium salt, diazonium salt, ammonium salt, pyridinium salt and the like.

Sulfone Compounds

β-ketoester, β-sulfonylsulfone, α-diazo compounds thereof and the like.

Sulfonic Acid Esters

Alkylsulfonic acid ester, haloalkylsulfonic acid ester, arylsulfonic acid ester, iminosulfonate and the like.

Others

Sulfonimide compounds, diazomethane compounds and the like.

Examples of the radical-reactive carbon-carbon double bond are, for instance, those represented by the above-mentioned formula, namely:

$$-O(C=O)CX^6=CX^7X^8$$

and examples of the cation-reactive carbon-carbon double bond are, for instance, those represented by the above-mentioned formulae, namely:

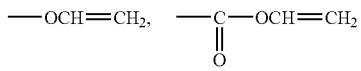

and the like.

As mentioned supra, the fluorine-containing resin composition of the present invention for optical amplification materials and light emission materials comprises the fluorine-containing prepolymer (I) and the compound (II) containing a rare earth metal ion and/or a rare earth metal. Further if necessary, an active energy curing initiator may be added to form a curable fluorine-containing resin composition and thereto is added a solvent mentioned infra to make a solution of fluorine-containing resin composition for coating. Further thereto may be added a curing agent.

Preferred curing agents are those which have at least one carbon-carbon unsaturated bond and can be polymerized with a radical or an acid. Examples thereof are radically polymerizable monomers such as acrylic monomers and cationically polymerizable monomers such as vinyl ether monomers. Those monomers may be monofunctional monomers having one carbon-carbon double bond or poly-functional monomers having two or more carbon-carbon double bonds.

Those so-called curing agents having a carbon-carbon unsaturated bond react by a radical or a cation generated by a reaction of the active energy curing initiator in the composition of the present invention with an active energy ray such as light and can be crosslinked with the carbon-carbon double bond of the fluorine-containing prepolymer (I) in the composition of the present invention by copolymerization.

Examples of the monofunctional acrylic monomer are acrylic acid, acrylic acid esters, methacrylic acid, methacrylic acid esters, α-fluoroacrylic acid, α-fluoroacrylic acid esters, maleic acid, maleic anhydride, maleic acid esters and (meth)acrylic acid esters having epoxy, hydroxyl, carboxyl or the like.

Among them, particularly preferred are acrylate monomers having fluoroalkyl group in order to maintain a high near infrared transparency of a cured article. For example, preferred are compounds represented by the formula:

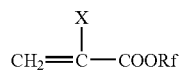

wherein X is H, $CH_3$ or F; Rf is a fluorine-containing alkyl group having 2 to 40 carbon atoms or a fluorine-containing alkyl group having 2 to 100 carbon atoms and ether bond.

Examples thereof are:

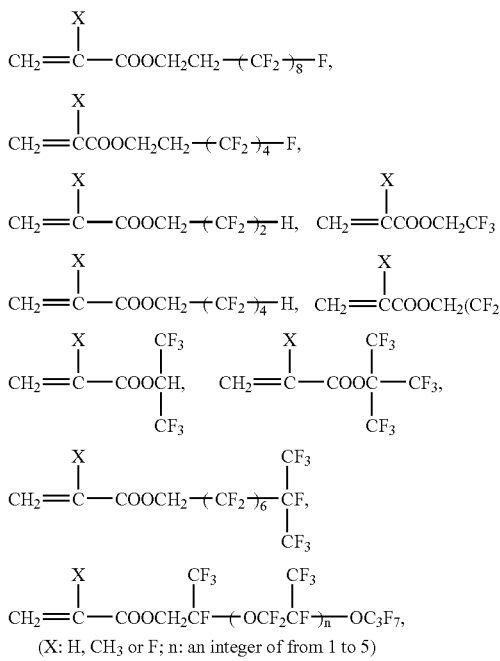

(X: H, CH₃ or F; n: an integer of from 1 to 5)

and the like.

As the polyfunctional acrylic monomer, there are generally known compounds obtained by replacing hydroxyl groups of polyhydric alcohols such as diol, triol and tetraol with acrylate groups, methacrylate groups or α-fluoroacrylate groups.

Examples thereof are compounds obtained by replacing two or more hydroxyl groups of polyhydric alcohols such as 1,3-butanediol, 1,4-butanediol, 1,6-hexanediol, diethylene glycol, tripropylene glycol, neopentyl glycol, trimethylol propane, pentaerythritol and dipentaerythritol with any of acrylate groups, methacrylate groups or α-fluoroacrylate groups.

Also there can be used polyfunctional acrylic monomers obtained by replacing two or more hydroxyl groups of polyhydric alcohols having a fluorine-containing alkyl group or a fluorine-containing alkylene group with acrylate groups, methacrylate groups or α-fluoroacrylate groups. Those monomers are preferred particularly from the point that a high near infrared transparency of a cured article can be maintained.

Preferable examples thereof are compounds having structures obtained by replacing two or more hydroxyl groups of fluorine-containing polyhydric alcohols represented by the formulae:

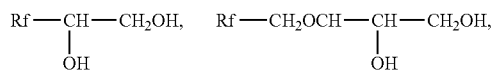

(Rf is a fluorine-containing alkyl group having 1 to 40 carbon atoms)

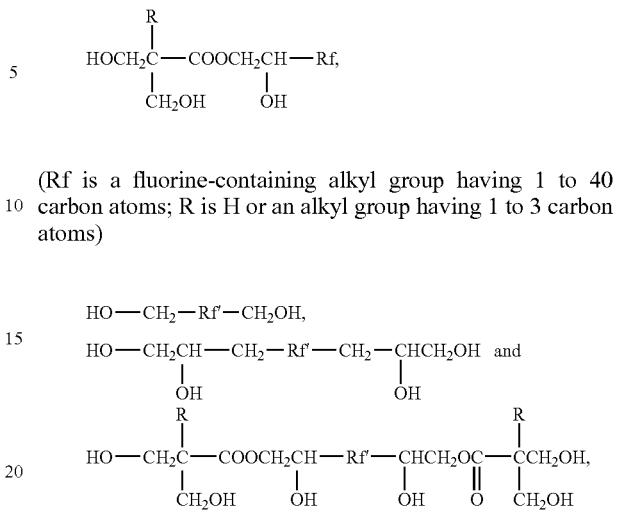

(Rf is a fluorine-containing alkyl group having 1 to 40 carbon atoms; R is H or an alkyl group having 1 to 3 carbon atoms)

(Rf' is a fluorine-containing alkylene group having 1 to 40 carbon atoms; R is H or an alkyl group having 1 to 3 carbon atoms), with acrylate groups, methacrylate groups or α-fluoroacrylate groups.

When those exemplified monofunctional and polyfunctional acrylic monomers are used as the curing agent for the composition of the present invention, particularly preferred are α-fluoroacrylate compounds from the viewpoint of good curing reactivity.

In the fluorine-containing resin composition of the present invention for optical amplification materials and light emission materials, an adding amount of the active energy curing initiator is optionally selected depending on the content of the carbon-carbon double bonds in the fluorine-containing prepolymer (I), an amount of the curing agent and further kinds of the initiator and active energy ray and an amount of irradiation energy (intensity and time) and also depending on whether or not the above-mentioned curing agent is used. When the curing agent is not used, the amount of the initiator is from 0.01 to 30 parts by weight, preferably from 0.05 to 20 parts by weight, most preferably from 0.1 to 10 parts by weight based on 100 parts by weight of the fluorine-containing prepolymer (I).

Concretely the amount of the initiator is from 0.05 to 50% by mole, preferably from 0.1 to 20% by mole, most preferably from 0.5 to 10% by mole based on the content (the number of moles) of the carbon-carbon double bonds contained in the fluorine-containing prepolymer (I).

When the curing agent is used, the amount of the initiator is from 0.05 to 50% by mole, preferably from 0.1 to 20% by mole, most preferably from 0.5 to 10% by mole based on the sum of the content (number of moles) of the carbon-carbon double bonds contained in the fluorine-containing prepolymer (I) and the number of moles of the carbon-carbon unsaturated bonds of the curing agent.

To the composition of the present invention may be added various additives as case demands in addition to the above-mentioned compounds.

Examples of the additives are, for instance, a leveling agent, viscosity control agent, light-stabilizer, moisture absorbing agent, pigment, dye, reinforcing agent and the like.

The fluorine-containing resin composition of the present invention for optical amplification materials and light emission materials is, as mentioned hereinafter, dissolved or dispersed in a solvent and is used for production of various parts for optical amplification and light emission.

The solvent to be used for making the solution is not limited particularly as far as the fluorine-containing prepolymer (I), active energy curing initiator and additives to be added as case demands such as a curing agent, leveling agent and light stabilizer are uniformly dissolved or dispersed in it. Particularly preferred is a solvent dissolving the fluorine-containing prepolymer (I) uniformly.

Examples of the solvent are, for instance, cellosolve solvents such as methyl cellosolve, ethyl cellosolve, methyl cellosolve acetate and ethyl cellosolve acetate; ester solvents such as diethyl oxalate, ethyl pyruvate, ethyl-2-hydroxybutyrate, ethyl acetoacetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate and ethyl 2-hydroxyisobutyrate; propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate and dipropylene glycol dimethyl ether; ketone solvents such as 2-hexanone, cyclohexanone, methyl amino ketone and 2-heptanone; alcohol solvents such as methanol, ethanol, propanol, isopropanol and butanol; aromatic hydrocarbons such as toluene and xylene; a solvent mixture of two or more thereof and the like.

Also in order to enhance solubility of the fluorine-containing prepolymer (I), a fluorine-containing solvent may be used as case demands.

Examples of the fluorine-containing solvent are, for instance, $CH_3CCl_2F$ (HCFC-141b), a mixture of $CF_3CF_2CHCl_2$ and $CClF_2CF_2CHClF$ (HCFC-225), perfluorohexane, perfluoro(2-butyltetrahydrofuran), methoxy-nonafluorobutane, 1,3-bistrifluoromethylbenzene, and in addition, fluorine-containing alcohols such as:

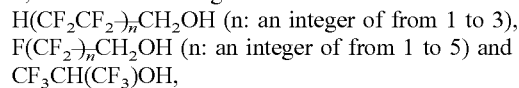

benzotrifluoride, perfluorobenzene, perfluoro(tributylamine), $ClCF_2CFClCF_2CFCl_2$ and the like.

Those fluorine-containing solvents may be used solely, in a mixture thereof or in a mixture of one or more of the fluorine-containing solvents and non-fluorine-containing solvents.

Among them, ketone solvents, acetic acid ester solvents, alcohol solvents and aromatic solvents are preferred from the viewpoint of coatability and productivity of a coating film.

The fluorine-containing resin composition of the present invention is formed into a cured article by photo-curing and is used as a part of an optical amplifying device such as an optical amplifier and as a part of a light emitting device.

The cured article is one having a maximum absorption coefficient of not more than 1 $cm^{-1}$ in a wavelength ranges of from 600 to 900 nm, from 1,290 to 1,320 nm and from 1,530 to 1570 nm.

The second of the present invention relates to the optical amplification material obtained by curing the fluorine-containing resin composition explained above and relates to the optical amplifying device in which the material is used on its core portion.

The third of the present invention relates to the light emission material obtained by curing the above-mentioned fluorine-containing resin composition and relates to the light emitting device in which the material is used on a part or the whole thereof, for example, the light emitting device using the light emission material on its core portion.

For producing the optical amplifying device or the light emitting device by using the fluorine-containing resin composition of the present invention, there can be used a method of dissolving the fluorine-containing resin composition in a proper solvent to obtain a coating solution; applying the coating solution on the given substrate to form the film of the fluorine-containing composition of the present invention; carrying out, through a known method, patterning of the film to a shape of an optical amplifying portion or a light emitting portion to form the optical amplifying portion or the light emitting portion; and then curing, preferably photo-curing. When the active energy curing initiator is blended, the composition curable with active energy ray (light) is obtained and therefore the patterning can be carried out using a photolithography technology.

The coating solution containing the composition of the present invention for forming the pattern of the optical amplifying portion or the light emitting portion may contain additives such as a curing agent, leveling agent and light stabilizer as case demands. The solvent for making the coating solution is not limited particularly as far as the composition of the present invention is uniformly dissolved or dispersed in it. Particularly preferred are the above-mentioned general-purpose solvents dissolving the curable fluorine-containing prepolymer (I) uniformly.

The optical amplifying device is a kind of optical wave-guide device having a core portion and a clad portion, and generally means a device which amplifies intensity of signal while the signal is passing through the core portion of the optical wave-guide formed on a substrate. In the optical amplifying device, it is necessary to form the core portion using a material having an optical amplifying ability.

The optical amplifying device of the present invention comprises the core portion (a portion of optical wave-guide having an optical amplifying ability) made of the fluorine-containing resin composition of the present invention containing a rare earth metal.

When the fluorine-containing resin composition of the present invention is used on the core portion of the optical amplifying device, a proper material for the clad portion is required. Though it is necessary to use the clad material having a refractive index lower than that of the core material, when the fluorine-containing resin composition of the present invention is used on the core portion, the clad material is not limited particularly and conventional organic materials can be used. It is a matter of course that the above-mentioned curable fluorine-containing prepolymer (I) may be used as it is.

The light emitting device of the present invention encompasses, for example, electroluminescent device, luminescent organic polymer, light emission diode, optical fiber laser, laser device, optical fiber, back lighting system for liquid crystal displays, photodetector and the like and can be applied on a large size display, illumination, liquid crystal, photo-disk, laser printer, laser for medical use, laser processing machine, printing machine, copying machine, etc.

In case of the light emitting device comprising the core portion and clad portion, like the optical amplifying device, it is possible that the light emission material of the present invention is used on the core portion, and on the clad portion is used a conventional organic material, for example, the above-mentioned fluorine-containing prepolymer (I) as it is.

The optical amplifying device and light emitting device of the present invention can be produced by known method except that the fluorine-containing resin composition of the present invention is used on the core portion.

General steps for producing optical devices (optical amplifying device and light emitting device) are shown in FIG. 1. First, a lower clad layer 2 is formed on a substrate 1. The clad layer 2 is formed using a material having a refractive index lower than that of a core layer 3. Then the core layer 3 is formed on the lower clad layer 2 using the fluorine-containing resin composition of the present invention. Further a mask pattern of an optical wave-guide is formed on the core layer 3 using a photo mask 4 through a photolithograph method. On the core layer 3 having the mask pattern formed thereon, etching is carried out through RIE (reactive ion etching) method to form a core pattern 5 of the optical wave-guide. After removing the mask, an upper clad layer 6 is formed on the core pattern 5 of the optical wave-guide. Thus the optical devices (optical amplifying device and light emitting device) are formed.

Also the optical amplifying device and light emitting device of the present invention can provide a multi-functional optical circuit when integrated with other optical devices. Examples of the other optical device are an optical switch, optical filter, optical branching device, etc. Particularly preferred is an optical circuit having, on the same substrate, the optical amplifying device of the present invention and an optical branch device having a N-branching wave-guide (N represents an integer of 2 or more) which is made of the same material as the core portion of the optical amplifying device and is connected to an output end of the core portion because the optical circuit can be a branch device assuring a small optical loss.

The present invention is then explained by means of examples and preparation examples, but is not limited to the examples.

In the following Examples and Preparation Examples, equipment and measuring conditions used for evaluation of physical properties are as follows.

(1) NMR: NMR analyzer is AC-300 available from BRUKER CO., LTD. Measuring conditions of $^1$H-NMR: 300 MHz (tetramethylsilane=0 ppm) Measuring conditions of $^{19}$F-NMR: 300 MHz (trichlorofluoromethane=0 ppm)

A ratio of conversion to $CH_2$=CF—C(=O)-(α-fluoroacryloyl) (5.2 to 5.8 ppm (2H)) can be calculated from the data of $^1$H-NMR analysis, and a ratio of α-fluoroacryloyl group (−116 to −118 ppm (1F))/$CF_2$ and $CF_3$ in a side chain (−85 to −75 ppm (10F)) can be calculated from the data of $^{19}$F-NMR analysis by usual method.

(2) IR analysis: Measuring is carried out at room temperature with a Fourier-transform infrared spectrophotometer 1760×available from Perkin Elmer Co., Ltd.

(3) GPC: A number average molecular weight is calculated from data measured by gel permeation chromatography (GPC) by using GPC HLC-8020 available from Toso Kabushiki Kaisha and columns available from Shodex Co., Ltd. (one GPC KF-801, one GPC KF-802 and two GPC KF-806M were connected in series) and flowing tetrahydrofuran (THF) as a solvent at a flowing rate of 1 ml/minute.

PREPARATION EXAMPLE 1

(Synthesis of Homopolymer of Fluorine-containing Allyl Ether Having OH Group)

A 100 ml four-necked glass flask equipped with a stirrer and thermometer was charged with 20.4 g of perfluoro-(1, 1,9,9-tetrahydro-2,5-bistrifluoromethyl-3,6-dioxanonenol):

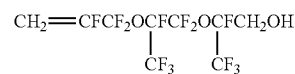

and 21.2 g of a perfluorohexane solution of 8.0% by weight of:

and after the inside of the flask was sufficiently replaced with nitrogen gas, stirring was carried out at 20° C. for 24 hours in nitrogen gas stream and a solid having a high viscosity was produced.

The obtained solid was dissolved in diethyl ether and poured into perfluorohexane, followed by separating and vacuum drying to obtain 17.6 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having hydroxyl at an end of its side chain. The number average molecular weight of the polymer was 9,000 according to the GPC analysis using tetrahydrofuran (THF) as a solvent and the weight average molecular weight thereof was 22,000.

PREPARATION EXAMPLE 2

(Synthesis of Copolymer of Fluorine-containing Allyl Ether Having OH Group)

A 100 ml four-necked glass flask equipped with a stirrer and thermometer was charged with 9.6 g of perfluoro-(1,1, 9,9-tetrahydro-2,5-bistrifluoromethyl-3,6-dioxanonenol):

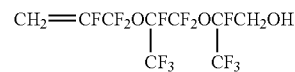

and 9.6 g of methyl 9H,9H-perfluoro-2,5-dimethyl-3,6-dioxa-8-nonenoate:

followed by stirring sufficiently and then adding 2.0 g of a perfluorohexane solution of 8.0% by weight of:

and after the inside of the flask was sufficiently replaced with nitrogen gas, stirring was carried out at 20° C. for 20 hours in nitrogen gas stream and a solid having a high viscosity was produced.

The obtained solid was dissolved in acetone and poured into a solution of HCFC225/n-hexane=1/1, followed by separating and vacuum drying to obtain 15.5 g of a transparent colorless polymer.

According to $^{19}$F-NMR, $^1$H-NMR and IR analyses, the polymer was a fluorine-containing copolymer comprising the structural unit of the above-mentioned fluorine-containing allyl ether having hydroxyl and the structural unit of the fluorine-containing allyl ether having methyl ester structure. The ratio thereof was 42:58 (mole ratio) according to NMR analysis.

The number average molecular weight of the copolymer was 7,200 according to the GPC analysis using tetrahydrofuran (THF) as a solvent and the weight average molecular weight thereof was 11,000.

PREPARATION EXAMPLE 3

(Synthesis of Curable Fluorine-containing Prepolymer having α-fluoroacryloyl Group)

A 200 ml four-necked flask equipped with a reflux condenser, thermometer, stirrer and dropping funnel was charged with 80 ml of diethyl ether, 5.0 g of the fluorine-containing allyl ether homopolymer having hydroxyl which was obtained in Preparation Example 1 and 2.0 g of pyridine, followed by cooling to 5° C. or lower with ice.

A solution obtained by dissolving 2.0 g of α-fluoroacrylic acid fluoride $CH_2$=CFCOF in 20 ml of diethyl ether was added thereto dropwise over about 30 minutes while stirring in nitrogen gas stream.

After completion of the addition, the flask temperature was raised to room temperature and the stirring was further continued for 4.0 hours.

The ether solution after the reaction was put in the dropping funnel, followed by washing with water, 2% hydrochloric acid solution, 5% NaCl solution and water and then drying with anhydrous magnesium sulfate. Then the ether solution was filtered for separation. Thus a curable fluorine-containing prepolymer was obtained.

According to $^{19}$F-NMR analysis of the ether solution, a conversion was nearly 100%.

The ether solution was coated on a NaCl plate and formed into a cast film at room temperature. According to IR analysis of the cast film, an absorption of a carbon-carbon double bond was observed at 1,661 cm$^{-1}$, and an absorption of C=O group was observed at 1,770 cm$^{-1}$.

PREPARATION EXAMPLE 4

(Synthesis of Curable Fluorine-containing Prepolymer Having α-fluoroacryloyl Group)

A curable fluorine-containing prepolymer (ether solution) was synthesized in the same manner as in Preparation Example 3 except that the copolymer of fluorine-containing allyl ether having hydroxyl which was obtained in Preparation Example 2 was used.

According to $^{19}$F-NMR analysis of the obtained prepolymer, a conversion was nearly 100%.

According to IR analysis, an absorption of a carbon-carbon double bond and an absorption of C=O group were observed at the same positions, respectively as in Preparation Example 3.

REFERENCE EXAMPLES 1 to 2

(Physical Properties of Cured Article)

(1) Preparation of Fluorine-containing Resin Composition

After methyl ethyl ketone (MEK) was added to the curable fluorine-containing prepolymers (ether solutions) having α-fluoroacryloyl group which were obtained in Preparation Examples 3 and 4, ether was distilled off with an evaporator to adjust concentrations of the respective polymers to 50% by weight.

To 10 g of the obtained polymer solution was added, as an active energy curing initiator, 0.1 g of 2-hydroxy-2-methylpropiophenone.

(2) Measurement of Refractive Index of Curable Fluorine-containing Prepolymer

The 8% MEK solution of the curable fluorine-containing prepolymer (the polymer solution before adding the curing initiator in (1) above) was coated on a polyester film with an applicator so that a coating thickness after the drying became about 100 μm. After vacuum drying at 50° C. for ten minutes, the obtained cast film was peeled from the polyester film and a refractive index thereof was measured using an Abbe's refractometer at 25° C. with light having a wavelength of 550 nm. The results are shown in Table 1.

(3) Measurement of Refractive Index of Cured Film

The composition prepared in (1) above was coated on an aluminum foil with an applicator so that a coating thickness became about 100 μm, followed by vacuum-drying at 50° C. for ten minutes.

After the drying, the un-cured film was irradiated with ultraviolet light using a high pressure mercury lamp at room temperature at an intensity of 1,000 mJ/cm$^2$U and, the aluminum foil was melted with diluted hydrochloric acid to obtain a cured film. A refractive index of the obtained cured film was measured in the same manner as in (2) above.

(4) Method of Measuring Absorption Coefficient

The composition prepared in (1) above was coated on an aluminum foil with an applicator so that a coating thickness became about 1 mm, followed by vacuum-drying at 50° C. for ten minutes. After the drying, the un-cured film was irradiated with ultraviolet light using a high pressure mercury lamp at room temperature at an intensity of 1,000 mJ/cm$^2$U and, the aluminum foil was melted with diluted hydrochloric acid to obtain a cured film. Light absorption (absorption coefficient) of the obtained cured film was measured using a spectrophotometer U3410 available from Hitachi, Ltd. with light having a wavelength of 650 nm, 1,310 nm and 1,550 nm, respectively. The results are shown in Table 1.

(5) Measurement of Solubility in Solvent

The un-cured film obtained in (4) above was irradiated with ultraviolet light (1,000 mJ/cm$^2$U, room temperature) and solubility in a solvent before and after the light irradiation was compared. The results are shown in Table 1.

The produced sample in the form of a film was dipped in acetone and the condition thereof after a lapse of one hour at room temperature was observed with naked eyes and evaluated by the following criteria.

○: There is no change in appearance.
×: Dissolved in acetone.

(6) Measurement of Thermal Characteristic (DSC)

With respect to the un-cured film and cured film obtained in (4) above, thermal characteristics thereof were measured at a temperature raising rate of 10° C./min using a differential calorimeter (DSC-50 available from Shimadzu Corporation), and it was found that any films had no peak indicating a clear crystalline melting point and were non-crystalline.

(7) Evaluation of Heat Resistance

The cured film obtained in (4) above was allowed to stand at 150° C. for one hour and a change in its form was observed and evaluated by the following criteria. The results are shown in Table 1.

○: There is no change in appearance.

×: The film could not maintain its original form.

(8) Measurement of Thermal Decomposition Temperature

With respect to the cured film obtained in (4) above, a thermal decomposition temperature was measured in nitrogen gas atmosphere at a temperature raising rate of 10° C./min using a thermogravimeter (TGA-50 available from Shimadzu Corporation). The thermal decomposition temperature was assumed to be a temperature where the weight of the film was reduced by 10% by weight. The results are shown in Table 1.

COMPARATIVE REFERENCE EXAMPLE 1

With respect to the un-cured article of fluorine-containing polymer having α-fluoroacryloyl group which was obtained in Preparation Example 3, each property shown in Table 1 was determined. The results are shown in Table 1.

TABLE 1

|  | Ref. Ex. 1 | Ref. Ex. 2 | Com. Ref. Ex. 1 |
|---|---|---|---|
| Prepolymer | Prep. Ex. 3 | Prep. Ex. 4 | Prep. Ex. 3 |
| Fluorine content of prepolymer (%) | 55 | 56 | 55 |
| Active energy curing initiator | 2-Hydroxy-2-methyl-propiophenone | 2-Hydroxy-2-methyl-propiophenone | 2-Hydroxy-2-methyl-propiophenone |
| Ratio of initiator to polymer (% by weight) | 2.1 | 2.1 | 2.1 |
| Amount of ultraviolet irradiation (mJ/cm$^2$) | 3,000 | 3,000 | Not irradiated |
| Refractive index |  |  |  |
| Before curing | 1.362 | 1.359 | 1.362 |
| After curing | 1.366 | 1.364 | — |
| Absorption coefficient cm$^{-1}$ |  |  |  |
| 650 nm | 0.025 | 0.018 | 0.022 |
| 1,310 nm | 0.048 | 0.031 | 0.045 |
| 1,550 nm | 0.311 | 0.213 | 0.282 |
| Solubility in solvent | ○ | ○ | X |
| Heat resistance | ○ | ○ | X |
| Thermal decomposition temperature (° C.) | 311 | 318 | — |

It can be seen from the above-mentioned results that the curable fluorine-containing resin which is used in the present invention is a material which has a high transparency and heat resistance and can be subjected to photo-curing and photo-lithographing.

EXAMPLE 1

(Preparation of Fluorine-containing Resin Composition Containing Rare Earth Metal)

A 100 ml four-necked glass flask equipped with a stirrer and thermometer was charged with 2.00 g of fluorine-containing allyl ether homopolymer having α-fluoroacryloyl group which was obtained in Preparation Example 3 and 15 g of methanol, and then a solution obtained by dissolving 0.60 g (1.50 mmol) of europium acetate (III) tetrahydrate (Eu(CH$_3$COO)$_3$.4H$_2$O) in 8 g of water was added thereto dropwise over five minutes with stirring. After completion of the addition, 2-hour stirring was continued, followed by allowing to stand for 30 minutes to precipitate a viscous solid. The supernatant methanol solution was removed by decantation and the solid was washed with acetone three times and then vacuum-dried at 60° C. for 12 hours to obtain 1.82 g of the fluorine-containing resin composition containing rare earth metal of the present invention as a colorless transparent solid.

EXAMPLE 2

(Preparation of Fluorine-containing Resin Composition Containing Rare Earth Metal)

A 100 ml four-necked glass flask equipped with a stirrer and thermometer was charged with 1.98 g of fluorine-containing allyl ether homopolymer having α-fluoroacryloyl group which was obtained in Preparation Example 3 and 15 g of methanol, and a solution obtained by dissolving 0.61 g (1.61 mmol) of erbium chloride hexahydrate (ErCl$_3$.6H$_2$O) in 3 g of methanol was added thereto dropwise over five minutes with stirring. After completion of the addition, 2-hour stirring was continued, followed by heating up to 60° C. while concentrating the solution with an evaporator. The heating was continued for one hour to obtain 2.08 g of the fluorine-containing resin composition containing rare earth metal of the present invention as a light-pink solid.

EXAMPLE 3

(Preparation of Fluorine-containing Resin Composition Containing Rare Earth Metal)

The fluorine-containing resin composition containing rare earth metal of the present invention as a colorless transparent solid was prepared in an amount of 1.78 g in the same manner as in Example 1 except that the fluorine-containing allyl ether copolymer having α-fluoroacryloyl group which was obtained in Preparation Example 4 was used.

EXAMPLES 4 TO 7

(Determination of Curing Reactivity by IR Analysis)

(1) Preparation of Fluorine-containing Resin Composition for Coating

Coating compositions were prepared using the curable fluorine-containing prepolymers obtained in Examples 1 to 3, respectively by the same procedures as in Reference Example 1 so that the concentration of polymer and the amount of active energy curing initiator became those shown in Table 2.

(2) Production of Film for IR Analysis

The above-mentioned coating compositions were coated on a polyester film with an applicator so that a coating thickness after drying became about 100 μm, followed by drying at 50° C. for five minutes. Then the obtained un-cured films were peeled from the polyester film to obtain un-cured cast films.

(3) Measurement of Curing Reactivity by IR Analysis

According to IR analysis of the un-cured films, an absorption of a carbon-carbon double bond in the polymer was observed at 1,661 cm$^{-1}$.

(4) Measurement of Ratio of Curing Reaction

Attention was directed to the absorption of the carbon-carbon double bond, and a change in intensity of the absorption after the light irradiation was measured. A ratio of curing reaction was calculated by the following equation.

$$\left(1 - \frac{\text{Peak height at 1,661 cm}^{-1} \text{ after light irradiation}}{\text{Peak height at 1,661 cm}^{-1} \text{ before light irradiation}}\right) \times 100\%$$

The un-cured films obtained in (2) above were irradiated with ultraviolet light at room temperature in irradiation amounts shown in Table 2 using a high pressure mercury lamp, and cured films were obtained. The amount of irradiation was changed and the ratio of curing reaction represented by the above equation was calculated. The results are shown in Table 2.

TABLE 2

|  | Ex. 4 | Ex. 5 | Ex. 6 | Ex. 7 |
|---|---|---|---|---|
| Curable fluorine-containing polymer | Ex. 1 | Ex. 2 | Ex. 3 | Ex. 1 |
| Content of —O(C=O)CF=CH$_2$ group (% by mole) | 40 | 40 | 40 | 40 |
| Solvent | MEK | MEK | MEK | MEK |
| Concentration of polymer (% by weight) | 8 | 8 | 8 | 8 |
| Active energy curing initiator | 2-hydroxy-2-methyl-propio-phenone | 2-hydroxy-2-methyl-propio-phenone | 2-hydroxy-2-methyl-propio-phenone | 2-hydroxy-2-methyl-propio-phenone |
| Ratio of initiator to polymer (% by weight) | 4.1 | 2.0 | 1.0 | 0.2 |
| Ratio of curing reaction Amount of ultraviolet irradiation (mJ/cm$^2$) |  |  |  |  |
| 100 | 100 | 100 (disappeared) | 59 | 40 | 33 |
| 500 | — | 83 | 59 | 42 |
| 1,500 | — | 100 (disappeared) | 72 | 57 |

PREPARATION EXAMPLE 5

(Synthesis of Curable Fluorine-containing Prepolymer Having α-fluoroacryloyl Group)

A curable fluorine-containing prepolymer (ether solution) was synthesized in the same manner as in Preparation Example 3 except that 2.0 g of α-fluoroacrylic acid fluoride (CH$_2$=CFCOF) and 2.0 g of pyridine were used.

According to $^{19}$F-NMR analysis of the ether solution of the prepolymer, the prepolymer was a copolymer comprising a fluorine-containing allyl ether having

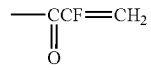

group and a fluorine-containing allyl ether having OH group in a ratio of 84:16% by mole.

According to IR analysis, an absorption of a carbon-carbon double bond and an absorption of C=O group were observed at the same positions as in Preparation Example 3, respectively. The fluorine content was 56% by weight and according to DSC analysis, it was confirmed that the polymer was non-crystalline.

EXAMPLE 8

(Preparation of Fluorine-containing Resin Composition Containing Rare Earth Metal)

The fluorine-containing resin composition containing rare earth metal as a colorless transparent solid was prepared in an amount of about 2 g in the same manner as in Example 1 except that the fluorine-containing allyl ether copolymer having α-fluoroacryloyl group which was obtained in Preparation Example 5 was used.

EXAMPLES 9 TO 11

(Determination of Curing Reactivity by IR Analysis)

(1) Preparation of Photo-curable Fluorine-containing Resin Composition

Respective compositions were prepared using the curable fluorine-containing resin composition obtained in Example 8 by the same procedures as in Reference Example 1 so that the concentrations of polymer and kinds and amounts of active energy curing initiator became those shown in Table 3.

(2) Production of Film for IR Analysis

The films were produced in the same manner as in Example 4.

(3) Measurement of Ratio of Curing Reaction by IR Analysis

A ratio of curing reaction when light irradiation was carried out in an irradiation amount of 1,500 mJ/cm$^2$ was calculated in the same manner as in Example 4. The results are shown in Table 3.

EXAMPLE 12

A photo-curable fluorine-containing resin composition was prepared by adding, as a curing agent,

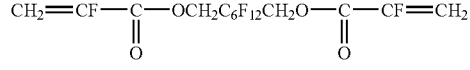

to the photo-curable composition obtained in Example 9 in an amount of 20% by weight based on the polymer.

A film for IR analysis was produced using this resin composition in the same manner as in Example 9, and a ratio of curing reaction was determined. The results are shown in Table 3.

TABLE 3

| | Ex. 9 | Ex. 10 | Ex. 11 | Ex. 12 |
|---|---|---|---|---|
| Curable fluorine-containing polymer | Ex. 8 | Ex. 8 | Ex. 8 | Ex. 8 |
| Content of —O(C=O)CF=CH$_2$ (% by mole) | 84 | 84 | 84 | 84 |
| Solvent | MEK | MEK | MEK | MEK |
| Concentration of polymer (% by weight) | 8 | 8 | 8 | 8 |
| Active energy curing initiator | 2-hydroxy-2-methyl-propio-phenone | 2,2-di-methoxy-2-phenyl aceto-phenone | Benzo-phenone | 2-hydroxy-2-methyl-propio-phenone |
| Ratio of initiator to polymer (% by weight) | 2.0 | 2.0 | 2.0 | 2.0 |
| Curing agent | — | — | — | Poly-functional acryl[1] |
| Ratio of curing agent to polymer (% by weight) | — | — | — | 20 |
| Ratio of curing reaction (at 1,500 mJ/cm$^2$) | 67.5 | 48.8 | 38.2 | 79.2 |

[1]Polyfunctional acryl:
CH$_2$=CF(C=O)OCH$_2$—(CF$_2$)$_6$—CH$_2$O(C=O)CF=CH$_2$

PREPARATION EXAMPLE 6

(Synthesis of Fluorine-containing Allyl Ether Homopolymer Having OH Group)

Synthesis of a polymer and refining of the obtained polymer were carried out in the same manner as in Preparation Example 1 except that 20.0 g of perfluoro-(1,1,9,9-tetrahydro-2,5-bistrifluoromethyl-3,6-dioxanonenol) and 10.0 g of a perfluorohexane solution of 8.0% by weight of:

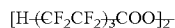

were used. Thus 18.2 g of a transparent colorless polymer was obtained.

According to $^{19}$F-NMR, $^1$H-NMR and IR analyses, the obtained polymer was a fluorine-containing polymer consisting of the structural unit of the above-mentioned fluorine-containing allyl ether and having hydroxyl at an end of its side chain. The number average molecular weight of the polymer was 30,000 according to the GPC analysis using tetrahydrofuran (THF) as a solvent and the weight average molecular weight thereof was 59,000.

PREPARATION EXAMPLE 7

(Synthesis of Copolymer Comprising Fluorine-containing Allyl Ether Having OH Group and Vinylidene Fluoride)

A 300 ml stainless steel autoclave equipped with a valve, pressure gauge and thermometer was charged with 34.2 g of perfluoro-(1,1,9,9-tetrahydro-2,5-bistrifluoromethyl-3,6-dioxanonenol), 200 g of CH$_3$CCl$_2$F (HCFC-141b) and 0.16 g of methanol solution of 50% by weight of dinormalpropyl peroxy carbonate (NPP). While cooling with dry ice/methanol solution, the inside of a system was sufficiently replaced with nitrogen gas. Then 5.8 g of vinylidene fluoride (VdF) was introduced through the valve, followed by a reaction while shaking at 40° C. With the advance of the reaction, 12 hours after starting of the reaction, a gauge pressure inside the system lowered from 4.4 MPaG (4.5 kgf/cm$^2$G) before the reaction to 0.98 MPaG (1.0 kgf/cm$^2$G).

At that time, un-reacted monomer was released and a precipitated solid was removed and dissolved in acetone, followed by re-precipitation with a solvent mixture of hexane and toluene (50/50) to separate a copolymer. The copolymer was vacuum-dried until a constant weight was reached. Thereby 31.2 g of a copolymer was obtained.

The components of the copolymer were VdF and the fluorine-containing allyl ether having OH group in a ratio of 55:45% by mole according to $^1$H-NMR and $^{19}$F-NMR analyses. The number average molecular weight of the copolymer was 12,000 according to the GPC analysis using THF as a solvent and the weight average molecular weight thereof was 18,000.

PREPARATION EXAMPLE 8

(Synthesis of Fluorine-containing Active Energy Curing Initiator)

A 200 ml four-necked flask equipped with a reflux condenser, thermometer, stirrer and dropping funnel was charged with 2.0 g of 2-hydroxy-2-methylpropiophenone, 1.0 g of pyridine and 20 g of a mixture (HCFC-225) of CF$_3$CF$_2$CHCl/CClF$_2$CF$_2$CHClF and was cooled to 5° C. or lower with ice.

Thereto was added dropwise 2.5 g of:

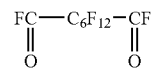

over one hour with stirring in nitrogen gas stream. After completion of the addition, the stirring was further continued for 4.0 hours.

After the reaction, the ether solution was put in the dropping funnel and washed with 2% hydrochloric acid solution and 5% NaCl solution, followed by separation of an organic layer, drying with anhydrous magnesium sulfate and distillation to isolate 2.6 g of a product (yield: 62%).

According to $^1$H-NMR, $^{19}$F-NMR and IR analyses, the product was:

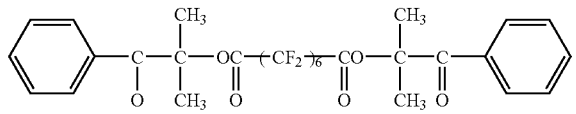

PREPARATION EXAMPLE 9

(Synthesis of Curable Fluorine-containing Prepolymer Having α-fluoroacryloyl Group)

A 200 ml four-necked flask equipped with a reflux condenser, thermometer, stirrer and dropping funnel was charged with 40 ml of methyl ethyl ketone (MEK), 5.0 g of the fluorine-containing allyl ether homopolymer having hydroxyl which was obtained in Preparation Example 2 and 2.0 g of pyridine, and was cooled to 5° C. or lower with ice.

Thereto was added dropwise 1.2 g of α-fluoroacrylic acid fluoride over about 30 minutes with stirring in nitrogen gas stream. After completion of the addition, the flask temperature was raised to room temperature and the stirring was further continued for 4.0 hours.

After the reaction, the MEK solution was put in the dropping funnel and washed with water, 2% hydrochloric acid solution, 5% NaCl solution and water, followed by separation of an organic layer and drying with anhydrous magnesium sulfate to obtain a curable fluorine-containing prepolymer. A concentration of the polymer after filtrating was 10.7% by weight.

According to $^{19}$F-NMR analysis of the MEK solution, the obtained prepolymer was a copolymer comprising a fluorine-containing allyl ether having

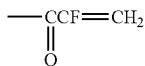

group and a fluorine-containing allyl ether having OH group in a ratio of 89:11% by mole.

According to IR analysis which was carried out in the same manner as in Preparation Example 3, an absorption of a carbon-carbon double bond and an absorption of C=O group were observed at 1,660 cm$^{-1}$ and 1,770 cm$^{-1}$, respectively. The fluorine content of the copolymer was 56% by weight and according to DSC analysis, it was confirmed that the copolymer was non-crystalline.

PREPARATION EXAMPLE 10

(Synthesis of Curable Fluorine-containing Prepolymer Having α-fluoroacryloyl Group)

A curable fluorine-containing prepolymer (MEK solution) was synthesized in the same manner as in Preparation Example 9 except that 5.0 g of the copolymer of fluorine-containing allyl ether having OH group and VdF which was obtained in Preparation Example 7, 2.2 g of pyridine and 2.0 g of α-fluoroacrylic acid fluoride were used. A concentration of the polymer was 9.9% by weight.

According to $^{19}$F-NMR analysis of the prepolymer, the conversion was nearly 100%. The fluorine content of the prepolymer was 56% by weight and according to DSC analysis, it was confirmed that the prepolymer was non-crystalline.

EXAMPLE 13

(1) Preparation of Photo-curable Fluorine-containing Resin Composition Containing Rare Earth Metal MEK was added to the curable fluorine-containing polymer (MEK solution) obtained in Preparation Example 9 to adjust the concentration of polymer to 8% by weight. Further in the MEK solution was dissolved Eu-acetylacetone complex so that its concentration became 1% by weight.

To the MEK solution of the fluorine-containing resin composition containing rare earth metal was added 2-hydroxy-2-methylpropiophenone as the active energy curing initiator so that its amount became 2.0% by weight based on the polymer. However the solution became turbid in white and there could not be obtained compatibility therebetween.

Therefore the fluorine-containing active energy curing initiator obtained in Preparation Example 8 was added instead of 2-hydroxy-2-methylpropiophenone so that its amount became 3.6% by weight based on the polymer. As a result, a transparent colorless solution was obtained and there was compatibility therebetween. The solution was the photo-curable fluorine-containing resin composition containing rare earth metal of the present invention.

(2) Evaluation of Photo-curable Composition

The photo-curable fluorine-containing resin composition containing the active energy curing initiator which was obtained in (1) above was formed into un-cured films having various thicknesses using an applicator. The films were irradiated with ultraviolet light at room temperature at an intensity of 3,000 mJ/cm$^2$U using a high pressure mercury lamp to obtain cured films. With respect to the obtained cured films, the following measurements were made.

(i) Measurement of Fluorescent Spectrum

An absorption spectrum in the wavelength region of from 300 to 1,700 nm was measured with a self-recording spectrophotometer (U-34110 available from Hitachi, Ltd.) to obtain an absorption wavelength corresponding to a peak absorbance which was assumed to be an excitation wavelength for the following fluorescence measurement. In case of a sample containing europium, an absorption wavelength derived from europium which was obtained in the above-mentioned measurement of absorption spectrum was assumed to be an excitation wavelength, and a fluorescent spectrum in the wavelength region of from 300 to 700 nm was measured with a fluorophotometer (F-3040 available from Hitachi, Ltd.). In case of a sample containing erbium, since it is known that a fluorescence around 1,500 nm in near infrared region is generated, whether or not there is a near infrared luminescence was observed with a near infrared camera (C-5840 available from Hamamatsu Photonics Kabushiki Kaisha). The results are shown in Table 4.

(ii) Measurement of Refractive Index

A refractive index was measured using an Abbe's refractometer at 25° C. with light having a wavelength of 550 nm. The results are shown in Table 4.

(iii) Content of Cation of Rare Earth Metal

A sample in an amount of about 2 g was measured precisely and subjected to ashing completely at 600° C. in an electric oven. The content of cation was calculated from a weight percent of the residue. The results are shown in Table 4.

(iv) Measurement of Fluorescence Life Time

A luminescence life time of the cured film (time required when an intensity of luminescence just after excitation of pulse decreases to 37%) was measured and was about 0.8 ms. This luminescence life time is longer by about 10$^4$ times to about 10$^6$ times as compared with usual dye compounds (for example, fluorescein, rhodamine, etc.) and therefore indicates that a state of inverted population necessary for exhibiting optical amplifying action can be easily formed.

(v) Durability Test

The cured film was stored for one week under environment of a temperature of 80° C. and a humidity of 85%, but there was no lowering of transparency at all.

EXAMPLE 14

(1) Preparation of Photo-curable Fluorine-containing Resin Composition Containing Rare Earth Metal MEK was added to the curable fluorine-containing prepolymer (MEK solution) obtained in Preparation Example 10 to adjust the concentration of polymer to 8% by weight. Further in the MEK solution was dissolved Er-acetylacetone complex so that its concentration became 1% by weight. To the MEK solution of the curable fluorine-containing prepolymer was added 2-hydroxy-2-methylpropiophenone as the active energy curing initiator so that its amount became 6.7% by weight based on the polymer. As a result, a transparent colorless solution was obtained and there was compatibility therebetween. The solution was the photo-curable fluorine-containing resin composition containing rare earth metal of the present invention.

(2) Evaluation of Photo-curable Composition

The photo-curable fluorine-containing resin composition containing the active energy curing initiator was formed into un-cured films having various thicknesses with an applicator. The films were irradiated with ultraviolet light at room temperature at an intensity of 3,000 mJ/cm²U using a high pressure mercury lamp to obtain cured films. With respect to the obtained cured films, the same tests as in Example 13 were made. The results are shown in Table 4.

TABLE 4

|  | Ex. 13 | Ex. 14 |
| --- | --- | --- |
| Pre-polymer | Prep. Ex. 9 | Prep. Ex. 10 |
| Rare earth metal | Eu | Er |
| Content of rare earth metal (% by weight) | 5 | 6 |
| Excitation wavelength (nm) | 394 | 980 |
| Fluorescence (wavelength) | Recognized (615 nm) | Recognized (1,550 nm) |
| Refractive index | 1.38 | 1.39 |

EXAMPLE 15

(Production of Optical Amplifying Device)

The optical amplifying device was produced in the manner mentioned below.

The optical amplifying device was produced using the fluorine-containing resin composition of Example 1 as a material for a core portion and the fluorine-containing prepolymer of Preparation Example 1 as a material for a clad portion.

Those two kinds of materials were dissolved in methyl isobutyl ketone to make respective solutions. First, the material for a clad portion was coated on a plastic substrate or a silicon substrate in a thickness of about 15 μm. After baking and drying, the material for a core portion was coated on the film of material for the clad portion in a thickness of about 8 μm. Next, light irradiation was carried out through a photo mask to cure the film of the core portion. Thereafter un-cured core portion was washed down with a solvent to form a rectangular pattern of the core portion having a length of 50 mm, a width of 8 μm and a height of 8 μm. After forming the core portion, the clad portion material was coated on the core portion as explained in FIG. 1. Thus the optical amplifying device was produced.

Next, a loss of light transmission of the produced optical amplifying device was measured by passing light having a wavelength of 633 nm through the core portion. The loss was 0.3 dB/cm.

When the thus produced optical amplifying device was irradiated with light by an ultraviolet lamp and viewed from the top thereof, there was recognized a red light emission pattern special to Eu ion in the linear form corresponding to the core portion. This indicates that the rare earth Eu ion necessary for optical amplifying action is contained only in the core portion.

PREPARATION EXAMPLE 11

(Synthesis of Eu(HFA)$_3$)

In a solvent mixture of water/methanol (8 ml of water and 3 ml of methanol), 2.0 g (5 mmol) of europium acetate (Eu(CH$_3$COO)$_3$.4H$_2$O) and 4.53 g (30 mmol) of hexafluoro acetylacetone (CF$_3$COCH$_2$OCCF$_3$) HFA were stirred at 50° C. for four hours. During the reaction, in order to neutralize a pH value of the solution, ammonia water was added dropwise until the pH value became 7. As the pH value of the solution approximated to neutral, an amount of a precipitate was increased. The obtained product was subjected to re-precipitation two times with chloroform and ethanol. The complex after the re-precipitation was dried for two days under reduced pressure. As a result of DTGA, the number of dehydrates was determined to be 2. Subsequently elementary analysis was carried out and it was confirmed that the intended complex had been synthesized. Hereinafter this is abbreviated to Eu(HFA)$_3$.

PREPARATION EXAMPLE 12

(Synthesis of Copolymer of Fluorine-containing Allyl Ether Having Hydroxyl)

A 100 ml four-necked glass flask equipped with a stirrer and thermometer was charged with 20.0 g of perfluoro-(1,1,9,9-tetrahydro-2,5-bistrifluoromethyl-3,6-dioxanonenol):

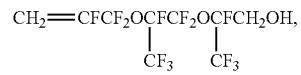

followed by sufficiently stirring and adding 12.9 g of a perfluorohexane solution of 8.0% by weight of:

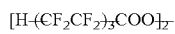

and after the inside of the flask was sufficiently replaced with nitrogen gas, stirring was carried out at 30° C. for 5 hours in nitrogen gas stream and thereby a solid having a high viscosity was produced.

The obtained solid was dissolved in acetone and poured into a solvent mixture of HCFC-141b (CH$_3$CCl$_2$F)/hexane (HCFC-141b/hexane=1/9 in % by volume), followed by separating and vacuum-drying to obtain 18.0 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having ketone group and hydroxyl at an end of its side chain. The number average molecular weight of the polymer was 6,700 according to the GPC analysis using tetrahydrofuran (THF) as a solvent and the weight average molecular weight thereof was 9,200.

PREPARATION EXAMPLE 13

(Synthesis of Copolymer of Fluorine-containing Allyl Ether Having α-fluoroacryloyl Group)

A 100 ml four-necked flask equipped with a reflux condenser, thermometer, stirrer and dropping funnel was charged with 20 ml of MIBK, 5.0 g of the fluorine-containing allyl ether copolymer having hydroxyl which was obtained in Preparation Example 12 and 0.94 g of pyridine, followed by cooling to 5° C. or lower with ice.

Then a solution obtained by dissolving 1.0 g of α-fluoroacrylic acid fluoride $CH_2=CFCOF$ in 20 ml of MIBK was added thereto dropwise over about 15 minutes while stirring in nitrogen gas stream.

After completion of the addition, the flask temperature was raised to room temperature and the stirring was further continued for 4.5 hours.

The ether solution after the reaction was put in the dropping funnel, followed by washing with a 1N aqueous solution of sodium hydrogencarbonate, 1N hydrochloric acid, saturated brine and water and then drying with anhydrous magnesium sulfate. Thus a fluorine-containing allyl ether copolymer having a cure site was obtained.

According to $^{19}$F-NMR analysis of the MIBK solution of copolymer, a conversion was nearly 50%. The fluorine content thereof was 58% by weight. According to IR analysis, an absorption of a carbon-carbon double bond was observed at 1,661 cm$^{-1}$, and it was confirmed by DSC analysis that the copolymer was non-crystalline.

EXAMPLE 16

(Production of Cured Film)

To the fluorine-containing prepolymer (MIBK solution) having a cure site (α-fluoroacryloyl group) and obtained in Preparation Example 13 was added MIBK to adjust the concentration of polymer to 50% by weight. To the solution was added Eu(HFA)$_3$ obtained in Preparation Example 11 and the concentration of europium ion was adjusted to be 1% by weight based on the polymer. Then 0.1 g of 2-hydroxy-2-methylpropiophenone was added as the active energy curing agent to 10 g of the solution.

The solution was colorless and transparent. The solution was coated on an aluminum foil with an applicator so that the coating thickness became about 100 μm, followed by vacuum-drying at 50° C. for 10 minutes. After the drying, the un-cured film was irradiated with ultraviolet light with a high pressure mercury lamp at an intensity of 1,000 mJ/cm$^2$U and the aluminum foil was melted with diluted hydrochloric acid to obtain the cured film.

The obtained cured film was colorless and transparent. When the cured film was irradiated with light of 394 nm which is an excitation wavelength of europium, emission of red light arose. An integrated intensity of luminescence at 615 nm band which was measured at the excitation wavelength of 394 nm with a fluorescence spectrophotometer (F-4010 available from Hitachi Ltd.) was as high as about 70 as compared with the integrated intensity of 1 in an aqueous solution of europium chloride having a reference concentration.

PREPARATION EXAMPLE 14

(Synthesis of Copolymer of Fluorine-containing Allyl Ether Having CO Group and Hydroxyl)

A 100 ml four-necked glass flask equipped with a stirrer and thermometer was charged with 10.0 g of 3H,12H,12H-perfluoro-5,8-dimethyl-6,9-dioxa-3-trifluoroacetyl-11-dodecene-2,4-dione (fluorine-containing allyl ether having CO group):

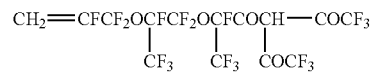

and 10.2 g of perfluoro-(1,1,9,9-tetrahydro-2,5-bistrifluoromethyl-3,6-dioxanonenol):

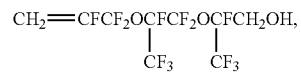

followed by stirring sufficiently. Then thereto was added 9.8 g of a perfluorohexane solution of 8.0% by weight of:

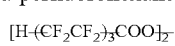

and after the inside of the flask was sufficiently replaced with nitrogen gas, stirring was carried out at 30° C. for 5 hours in nitrogen gas stream and thereby a solid having a high viscosity was produced.

The obtained solid was dissolved in acetone and then poured into perfluorohexane, followed by separating and vacuum-drying to obtain 14.7 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having ketone group and hydroxyl at an end of its side chain.

According to $^{19}$F-NMR analysis, the fluorine-containing polymer was one comprising the fluorine-containing allyl ether having

group and the fluorine-containing allyl ether having OH group in % by mole ratio of 51/49.

The number average molecular weight of the polymer was 3,200 according to the GPC analysis using tetrahydrofuran (THF) as a solvent and the weight average molecular weight thereof was 4,200.

PREPARATION EXAMPLE 15

(Synthesis of Copolymer of Fluorine-containing Allyl Ether Having CO Group and Cure Site)

A 200 ml four-necked flask equipped with a reflux condenser, thermometer, stirrer and dropping funnel was charged with 80 ml of diethyl ether, 5.1 g of the fluorine-containing allyl ether copolymer having CO group and OH group which was obtained in Preparation Example 14 and 2.1 g of pyridine, followed by cooling to 5° C. or lower with ice.

Then a solution obtained by dissolving 2.0 g of α-fluoroacrylic acid fluoride ($CH_2=CFCOF$) in 20 ml of diethyl ether was added thereto dropwise over about 30 minutes while stirring in nitrogen gas stream.

After completion of the addition, the flask temperature was raised to room temperature and the stirring was further continued for 4.5 hours.

The ether solution after the reaction was put in the dropping funnel, followed by washing with water, 2% hydrochloric acid solution, 5% NaCl solution and water and then drying with anhydrous magnesium sulfate. Then the ether solution was filtered for separation. Thus a fluorine-containing allyl ether copolymer having CO group and a cure site was obtained.

According to $^{19}$F-NMR analysis of the ether solution, a conversion was nearly 100%. The fluorine content thereof was 57% by weight. According to IR analysis, an absorption of a carbon-carbon double bond was observed at 1,661 cm$^{-1}$, and it was confirmed by DSC analysis that the copolymer was non-crystalline.

EXAMPLE 17

(Production of Cured Film)

To the fluorine-containing prepolymer (ether solution) having CO group and a cure site (α-fluoroacryloyl group) and obtained in Preparation Example 9 was added MEK, and ether was distilled off with an evaporator to adjust the concentration of polymer to 50% by weight. To the solution was added europium chloride and the concentration of europium ion was adjusted to be 5% by weight based on the polymer. Then 0.1 g of 2-hydroxy-2-methylpropiophenone was added as the active energy curing initiator to 10 g of the solution.

The solution was colorless and transparent. The solution was coated on an aluminum foil with an applicator so that the coating thickness became about 100 μm, followed by vacuum-drying at 50° C. for 10 minutes. After the drying, the un-cured film was irradiated with ultraviolet light with a high pressure mercury lamp at an intensity of 1,000 mJ/cm$^2$U and the aluminum foil was melted with diluted hydrochloric acid to obtain the cured film.

The obtained cured film was colorless and transparent. When the cured film was irradiated with light of 394 nm which is an excitation wavelength of europium, strong emission of red light arose.

According to the present invention, there can be obtained a suitable optical amplification material and light emission material which have a stable structure comprising a specific fluorine-containing polymer and a rare earth metal ion while maintaining transparency in a region of from visible light to near infrared light. When this fluorine-containing resin composition is used, excellent optical amplifying device and light emitting device can be produced by relatively easy steps.

What is claimed is:

1. A fluorine-containing resin composition comprising (I) a fluorine-containing prepolymer and (II) a compound containing a rare earth metal ion and/or a rare earth metal element, wherein
   (1) the fluorine-containing prepolymer (I) is a non-crystalline polymer having a fluorine content of not less than 25% by weight and
   (2) the fluorine-containing prepolymer (I) contains repeating units having a cure site comprising a carbon-carbon double bond in a side chain of the polymer and/or at an end of a trunk chain of the polymer in an amount of not less than 0.1 mol % based on all structural units constituting the prepolymer (I).

2. The fluorine-containing resin composition of claim 1, wherein the fluorine-containing prepolymer (I) is a polymer having a maximum absorption coefficient of not more than 1 cm$^{-1}$ in a wavelength range of from 1,290 to 1,320 nm.

3. The fluorine-containing resin composition of claim 1, wherein the fluorine-containing prepolymer (I) is a polymer having a maximum absorption coefficient of not more than 1 cm$^{-1}$ in a wavelength range of from 1,530 to 1,570 nm.

4. The fluorine-containing resin composition of claim 1, wherein the fluorine-containing prepolymer (I) is a polymer having a maximum absorption coefficient of not more than 1 cm$^{-1}$ in a wavelength range of from 600 to 900 nm.

5. The fluorine-containing resin composition of claim 1, wherein the fluorine-containing prepolymer (I) has a carbon-carbon double bond at an end of the polymer side chain.

6. The fluorine-containing resin composition of claim 1, wherein the fluorine-containing prepolymer (I) has recurring units of a fluorine-containing ethylenic monomer having a cure site.

7. The fluorine-containing resin composition of claim 1, wherein the fluorine-containing prepolymer (I) is a fluorine-containing polymer having a number average molecular weight of from 500 to 1,000,000 and represented by the formula (1):

 (1)

in which the structural unit M is a structural unit derived from a fluorine-containing ethylenic monomer represented by the formula (M):

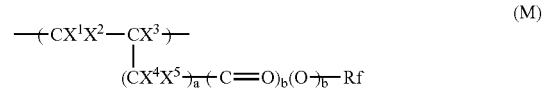 (M)

wherein $X^1$ and $X^2$ are the same or different and each is H or F; $X^3$ is H, F, CH$_3$ or CF$_3$; $X^4$ and $X^5$ are the same or different and each is H, F or CF$_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from ito 3; b and c are the same or different and each is 0 or 1, the structural unit A is a structural unit derived from monomer copolymerizable with the fluorine-containing ethylenic monomer providing the structural unit M, and the structural unit M and the structural unit A are contained in amounts of from 0.1 to 100% by mole and from 0 to 99.9% by mole, respectively.

8. The fluorine-containing resin composition of claim 7, wherein the fluorine-containing prepolymer (I) is the polymer of the formula (1) and the structural unit M is a structural unit M1 derived from a fluorine-containing ethylenic monomer and represented by the formula (M1):

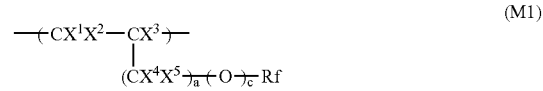 (M1)

wherein $X^1$ and $X^2$ are the same or different and each is H or F; $X^3$ is H, F, CH$_3$ or CF$_3$; $X^4$ and $X^5$ are the same or different and each is H, F or CF$_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1.

9. The fluorine-containing resin composition of claim 7, wherein the fluorine-containing prepolymer (I) is the polymer of the formula (1) and the structural unit M is a structural unit M2 derived from a fluorine-containing ethylenic monomer and represented by the formula (M2):

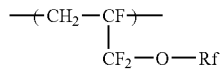  (M2)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

10. The fluorine-containing resin composition of claim 7, wherein the fluorine-containing prepolymer (I) is the polymer of the formula (1) and the structural unit M is a structural unit M3 derived from a fluorine-containing ethylenic monomer and represented by the formula (M3):

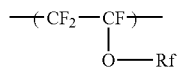  (M3)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

11. The fluorine-containing resin composition of claim 7, wherein at least one of $Y^1$ in Rf of said formula (M) is bonded to an end of Rf.

12. The fluorine-containing resin composition of claim 11, wherein $Y^1$ in Rf of said formula (M) is:

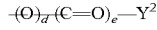

wherein $Y^2$ is an alkenyl group or fluorine-containing alkenyl group having 2 to 5 carbon atoms and an ethylenic carbon-carbon double bond at an end thereof; d and e are the same or different and each is 0 or 1.

13. The fluorine-containing resin composition of claim 12, wherein $Y^1$ in Rf of said formula (M) is:

—O(C=O)CX$^6$=CX$^7$X$^8$ wherein $X^6$ is H, F, $CH_3$ or $CF_3$; $X^7$ and $X^8$ are the same or different and each is H or F.

14. A fluorine-containing resin composition which comprises the fluorine-containing prepolymer (I) of claim 1 and a rare earth organometal complex (II-2).

15. The fluorine-containing resin composition of claim 1 which contains an active energy curing initiator (III) in addition to the fluorine-containing prepolymer (I) and the compound (II) containing a rare earth metal ion and/or a rare earth metal element.

16. The fluorine-containing resin composition of claim 15, wherein the fluorine-containing prepolymer (I) is a fluorine-containing prepolymer having an ethylenic carbon-carbon double bond having radical reactivity and the active energy curing initiator (III) is a photoradical generator (III-1).

* * * * *